(12) United States Patent
Aiki et al.

(10) Patent No.: US 11,586,192 B2
(45) Date of Patent: Feb. 21, 2023

(54) OPERATION ASSISTANCE METHOD FOR EXECUTING RECOMMENDED ACTION IN RESPONSE TO ALERT

(71) Applicant: MITSUBISHI POWER, LTD., Yokohama (JP)

(72) Inventors: Hidetoshi Aiki, Yokohama (JP); Kazuhiko Saito, Yokohama (JP); Ryo Nishida, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/259,646

(22) PCT Filed: Jul. 30, 2019

(86) PCT No.: PCT/JP2019/029752
§ 371 (c)(1),
(2) Date: Jan. 12, 2021

(87) PCT Pub. No.: WO2020/027095
PCT Pub. Date: Feb. 6, 2020

(65) Prior Publication Data
US 2021/0318677 A1 Oct. 14, 2021

(30) Foreign Application Priority Data
Jul. 30, 2018 (JP) .............................. JP2018-142091

(51) Int. Cl.
*G05B 23/02* (2006.01)
(52) U.S. Cl.
CPC ................................ *G05B 23/0275* (2013.01)
(58) Field of Classification Search
None
See application file for complete search history.

(56) References Cited

U.S. PATENT DOCUMENTS

| | | | | |
|---|---|---|---|---|
| 5,353,315 A | * | 10/1994 | Scarola | G05B 23/027 700/83 |
| 5,885,215 A | * | 3/1999 | Dossel | A61B 5/245 600/409 |
| 6,609,038 B1 | * | 8/2003 | Croswell | G05B 19/409 700/180 |

(Continued)

FOREIGN PATENT DOCUMENTS

| | | |
|---|---|---|
| JP | H08-278814 A | 10/1996 |
| JP | 2001-290531 A | 10/2001 |

(Continued)

OTHER PUBLICATIONS

Salah et al. 'A model-based survey of alert correlation techniques' Computer Networks 57 (2013) 1289-1317.*

(Continued)

*Primary Examiner* — Bernard G Lindsay
(74) *Attorney, Agent, or Firm* — WHDA, LLP

(57) ABSTRACT

An operation assistance method for presenting a recommended operational action in response to an alert issued in a facility includes: detecting issuance of the alert; extracting, from an alert history storage unit, an issuance history of a same type of alert as the alert of which the issuance or the sign of issuance has been detected; extracting, from an operation history storage unit storing an operation history of the facility, an operational action after issuance of the same type of alert; extracting, from an operational data storage unit storing information indicating an operational state of the facility, information indicating the operational state after the operational action, and verifying an influence of the operational action on the operational state; and presenting the recommended operational action in response to the alert of which the issuance has been detected, based on the extracted operational action and the verified influence.

7 Claims, 11 Drawing Sheets

(56) References Cited

U.S. PATENT DOCUMENTS

| | | | | |
|---|---|---|---|---|
| 2004/0078171 | A1* | 4/2004 | Wegerich | G05B 23/0254 |
| | | | | 702/188 |
| 2006/0143034 | A1* | 6/2006 | Rothermel | G06Q 10/10 |
| | | | | 705/301 |
| 2006/0171329 | A1* | 8/2006 | Ying | H02J 13/0062 |
| | | | | 370/254 |
| 2009/0271232 | A1* | 10/2009 | Waguet | G06Q 10/06 |
| | | | | 705/7.36 |
| 2016/0085235 | A1 | 3/2016 | Kamijo | |
| 2017/0084167 | A1* | 3/2017 | Bump | G06F 11/079 |
| 2017/0243466 | A1 | 8/2017 | Krishnaswami et al. | |
| 2019/0086903 | A1 | 3/2019 | Ochiai | |

FOREIGN PATENT DOCUMENTS

| | | |
|---|---|---|
| JP | 2006-228030 A | 8/2006 |
| JP | 2013-191141 A | 9/2013 |
| JP | 5331774 B2 | 10/2013 |
| JP | 5439265 B2 | 3/2014 |
| JP | 2016-066200 A | 4/2016 |
| WO | 2017/169282 A1 | 10/2017 |

OTHER PUBLICATIONS

International Search Report dated Oct. 29, 2019, issued in counterpart Application No. PCT/JP2019/029752, with English Translation. (12 pages).

Notification Concerning Transmittal of International Preliminary Report on Patentability (Forms PCT/IB/326) Issued in counterpart International Application No. PCT/JP2019/029752 dated Feb. 11, 2021 with Forms PCTI/B/373, PCT/IB/338 and PCT/ISA/237. (17 pages).

Office Action dated Mar. 2, 2022, issued in counterpart GB application No. 2100806.5 (4 pages).

* cited by examiner

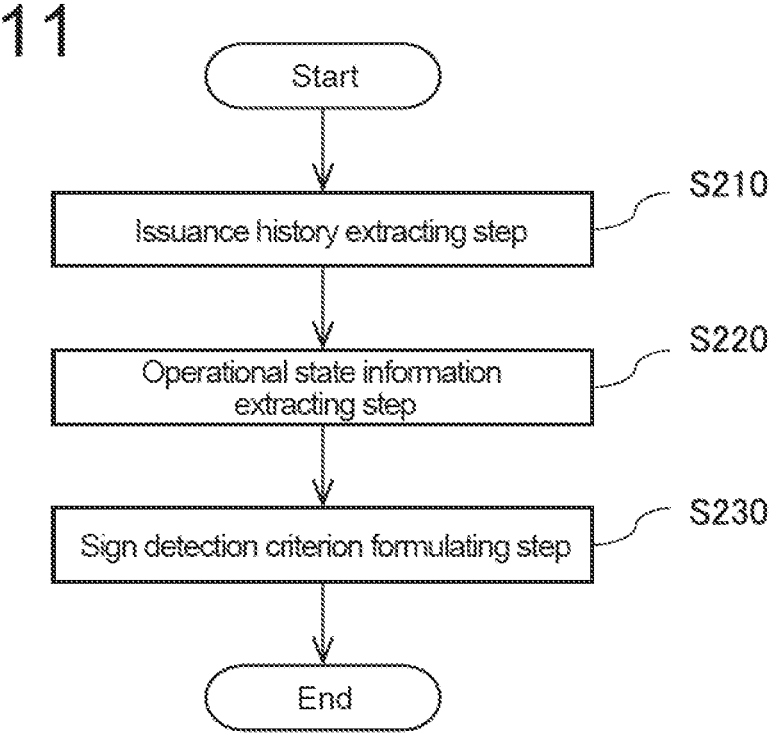

OPERATION ASSISTANCE METHOD FOR EXECUTING RECOMMENDED ACTION IN RESPONSE TO ALERT

TECHNICAL FIELD

The present disclosure relates to an operation assistance method and an operation assistance system.

BACKGROUND

Various sensors are placed in a facility to acquire information such as the operational state of the facility. In such a facility, an alert may be issued when an abnormality is detected in these sensors (see Patent Document 1).

CITATION LIST

Patent Literature

Patent Document 1: JP5331774B

SUMMARY

Problems to be Solved

When the alert is issued, the operator who operates or manages the facility is required to determine, from the sensors that detected the abnormality and all related operational data, whether it is likely to lead to non-conformity which increasingly damages the facility. In addition, he is required to take measures to eliminate an assumed non-conformity event as necessary. However, it is often difficult for an inexperienced operator to derive an appropriate decision in a short period of time.

In view of the above, an object of at least one embodiment of the present invention is to present a recommended response to an alert issued in the facility.

Solution to the Problems (1) According to at least one embodiment of the present invention, an operation assistance method for presenting a recommended operational action in response to an alert issued when an issuance criterion is satisfied in a facility comprises: a step of detecting issuance of the alert or a sign of issuance of the alert; a step of extracting, from an alert history storage unit storing an alert issuance history of the facility, an issuance history of a same type of alert as the alert of which the issuance or the sign of issuance has been detected; a step of extracting, from an operation history storage unit storing an operation history of the facility, an operational action after issuance of the same type of alert; a step of extracting, from an operational data storage unit storing information indicating an operational state of the facility, information indicating the operational state after the operational action, and verifying an influence of the operational action on the operational state; and a step of presenting the recommended operational action in response to the alert of which the issuance or the sign of issuance has been detected, based on the extracted operational action and the verified influence.

With the above method (1), when issuance of the alert or a sign of issuance of the alert is detected, it is possible to present a recommended operational action for a non-conformity event which is assumed to be the cause of the issuance of the alert. The recommended operational action is an operational action of which the influence on the operational state is verified, based on information indicating the operational condition of the facility and the operation history in the past. Thus, even the inexperienced operator can take an appropriate response to the nonconformity event by referring to the presented, recommended operational action.

(2) In some embodiments, in the above method (1), the alert of which the issuance or the sign of issuance has been detected includes a plurality of different alerts. The issuance history extracting step includes extracting an issuance history of a same type of alert as each of the plurality of different alerts. The operational action extracting step includes extracting an operational action after issuance of the same type of alert for each of the plurality of different alerts. The influence verifying step includes verifying an influence of each operational action on the operational state. The recommended operational action presenting step includes presenting the recommended operational action in consideration of each of the extracted operational actions, each of the verified influences, a combination of the plurality of different alerts, and a timing when each of the plurality of different alerts is issued.

The non-conformity event in the facility assumed to be the cause of issuance of the alert may not be limited to one event. Therefore, in the case where one alert is issued, multiple non-conformity events may be considered, and the operational action for eliminating these non-conformity events may differ for each non-conformity event.

In such a case, for example, it is conceivable to present different recommended operational actions for individual non-conformity events. However, in this case, the recommended operational action effective for eliminating the actually occurring non-conformity event may be a part of the presented plurality of recommended operational actions.

Meanwhile, in the case where a plurality of alerts are issued at the same time, there may be a possible non-conformity event common to the issued alerts. Therefore, in the case where a plurality of alerts are issued at the same time, by extracting, for each of the alerts, the operational action that can eliminate the non-conformity event assumed to be the cause of issuance of the alert, it is possible to narrow down the operational actions that can eliminate the common non-conformity event for which the alerts are issued.

Accordingly, with the above method (2), by considering the combination of the plurality of alerts, it is possible to present a more appropriate recommended operational action.

(3) In some embodiments, the above method (1) or (2) further comprises a step of obtaining a sign detection criterion for detecting the sign in the detecting step, based on the alert issuance history stored in the alert history storage unit and information before issuance of the alert among the information stored in the operational data storage unit.

With the above method (3), the sign of issuance of the alert can be detected by using the obtained sign detection criterion, so that the possibility of further suppressing the occurrence of non-conformity event increases, which contributes to the stable operation of the facility.

(4) In some embodiments, any one of the above methods (1) to (3) further comprises: a step of performing at least one of: extraction of a history of a second alert issued at a same time as a first alert that has been issued in past from the issuance history stored in the alert history storage unit; extraction of the operational action at the same time from the operation history stored in the operation history storage unit; or extraction of information indicating the operational state after the operational action from the operational data storage unit and verification an influence of the operational action on the operational state; and a step of determining validity of issuance of the first alert in response to issuance of the first alert, based on a result obtained in the step of performing the at least one.

With the above method (4), since the validity of issuance of the alert is determined upon issuance of the alert, it is possible to inform the operator of the validity of the issued alert.

(5) In some embodiments, the above method (4) further comprises a step of modifying the issuance criterion or a sign detection criterion for detecting the sign in the detecting step, based on a result obtained in the step of performing the at least one.

For example, if the alert issuance criterion is set to the safe side more than necessary, the operational action for eliminating the alert issuance factor may not be executed even if the alert is issued. In such a case, it is desirable to modify the alert issuance criterion so that the alert is issued at an appropriate timing.

In this regard, with the above method (5), the issuance criterion or the sign detection criterion can be modified, based on at least one of the history of the second alert issued at the same time as the first alert that has been issued in the past, the operational action at the same time, or the verification result of the influence of the operational action on the operational state. Thus, for example, regarding a certain alert, it is possible to find the situation where, although the alert had been issued, the operational action for eliminating the alert issuance factor was not executed repeatedly. Further, it is possible to confirm whether a further malfunction event has not occurred even though the operational action for eliminating the alert issuance factor was not executed. If a further malfunction event has not occurred even though the operational action for eliminating the alert issuance factor was not executed, it may be determined that the alert issuance criterion is set to the safe side more than necessary, so that the alert issuance criterion may be modified. Thus, with the above method (5), it is possible to appropriately set the timing when the alert is issued and the timing when the sign of issuance of the alert is detected.

(6) In some embodiments, in any one of the above methods (1) to (5), the recommended operational action includes a plurality of recommended operational actions, and the operation assistance method further comprises a step of determining an order in which the recommended operational actions are presented in the recommended operational action presenting step, according to priority of the plurality of recommended operational actions.

With the above method (6), since the plurality of recommended operational actions are presented in an order according to the priority, even if the plurality of recommended operational actions are presented, the facility operator can easily determine which recommended operational action is desirable.

(7) In some embodiments, the above method (6) further comprises: a step of storing an execution history of the recommended operational action executed in response to an issued alert in association with the alert; and a step of setting the priority of the recommended operational actions, based on the stored execution history.

With the above method (7), for example, it is possible to set the priority of the recommended operational action that has been performed frequently in the past to be higher than the priority of the recommended operational action that has been performed infrequently in the past. This makes it easier for the operator to select the recommended operational action that has been frequently performed in the past.

(8) In some embodiments, the above method (6) further comprises a step of setting the priority of the recommended operational action for avoiding a serious failure of the facility to be higher than the other recommended operational actions.

With the above method (8), it is possible to easily avoid a serious failure of the facility.

(9) In some embodiments, in any one of the above methods (1) to (8), the recommended operational action presenting step includes presenting the recommended operational action only in response to the alert that has been previously selected.

With the above method (9), by previously setting an alert for which the operator desires the presentation of the recommended operational action, the recommended operational action is presented only to the alert for which the operator desires the presentation of the recommended operational action, so that the information needed by the operator can be provided.

(10) According to at least one embodiment of the present invention, an operation assistance system for presenting a recommended operational action in response to an alert issued when an issuance criterion is satisfied in a facility comprises: a detecting unit for detecting issuance of the alert or a sign of issuance of the alert; an alert history storage unit storing an alert issuance history of the facility; an issuance history extracting unit for extracting, from the alert history storage unit, an issuance history of a same type of alert as the alert of which the issuance or the sign of issuance has been detected; an operation history storage unit storing an operation history of the facility; an operational action extracting unit for extracting, from the operation history storage unit, an operational action after issuance of the same type of alert; an operational data storage unit storing information indicating an operational state of the facility; a verifying unit for extracting, from the operational data storage unit, information indicating the operational state after the operational action, and verifying an influence of the operational action on the operational state; and a presenting unit for presenting the recommended operational action in response to the alert of which the issuance or the sign of issuance has been detected, based on the extracted operational action and the verified influence.

With the above configuration (10), when issuance of the alert or a sign of issuance of the alert is detected, it is possible to present a recommended operational action for the non-conformity event which is the cause of the issuance of the alert. The recommended operational action is an operational action of which the influence on the operational state is verified, based on information indicating the operational condition of the facility and the operation history in the past. Thus, even the inexperienced operator can take an appropriate response to the nonconformity event by referring to the presented, recommended operational action.

Advantageous Effects

According to at least one embodiment of the present invention, it is possible to present a recommended response to an alert issued in the facility.

BRIEF DESCRIPTION OF DRAWINGS

FIG. 11 is a flowchart showing the process for obtaining a sign detection criterion.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
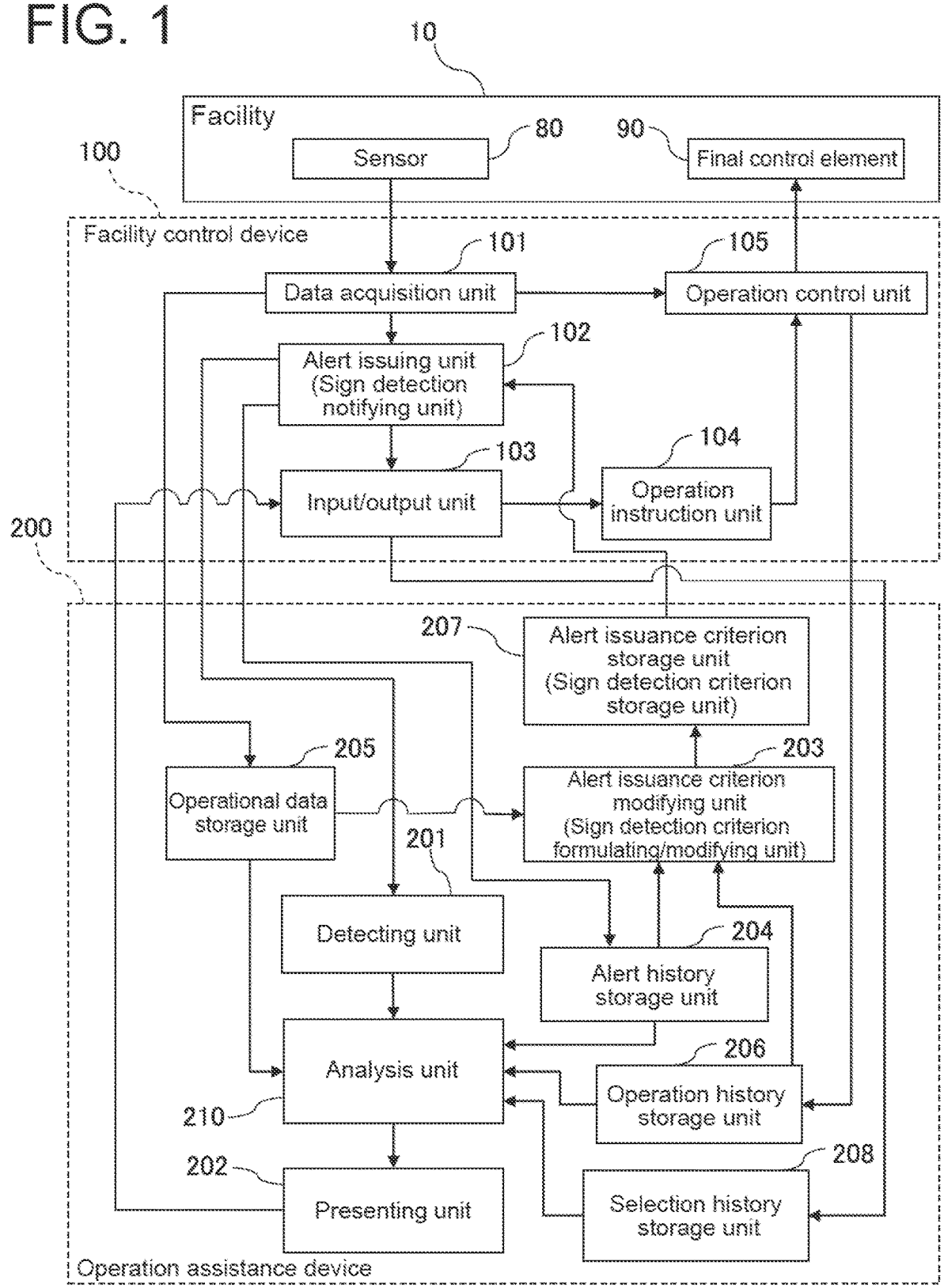
FIG. 1 is an overall configuration diagram of an operation assistance system according to some embodiments.

FIG. 1 is an overall configuration diagram of an operation assistance system according to some embodiments. The operation assistance system 1 according to some embodiments includes a facility control device 100 for controlling a facility 10, and an operation assistance device 200 for assisting the operation of the facility 10.

(Facility Control Device 100)

The facility control device 100 according to some embodiments includes a data acquisition unit 101, an alert issuing unit 102, an input/output unit 103, an operation instruction unit 104, and an operation control unit 105.

The data acquisition unit 101 is configured to acquire information from a plurality of sensors 80 disposed on various parts of the facility 10, i.e., information indicating the operational state of the facility 10. Further, the data acquisition unit 101 is configured to output the acquired information to the operation control unit 105, the alert issuing unit 102, and an operational data storage unit 205 of the operation assistance device 200, which will be described later.

The alert issuing unit 102 is configured to compare the information of the sensor 80 input via the data acquisition unit 101, i.e., the output value of the sensor 80 with an alert issuance criterion previously set for each sensor 80, and determine whether the output value of the sensor 80 satisfies the alert issuance criterion of the sensor 80. The alert issuing unit 102 is configured to, if the output value of the sensor 80 satisfies the alert issuance criterion of the sensor 80, output an alert issuance signal. In the following, outputting an alert issuance signal from the alert issuing unit 102 may be also simply expressed as issuing an alert.

In some embodiments, the issuance criterion is stored in an alert issuance criterion storage unit 207 of the operation assistance device 200, which will be described later.

The alert issuing unit 102 is configured to output the issuance signal to a detecting unit 201 and an alert history storage unit 204 of the operation assistance device 200, which will be described later.

The input/output unit 103 includes, for example, an operation device for operating the facility 10, an input device such as a keyboard and a mouse, a display device, and a sound or voice notifying device. For example, the input/output unit 103 is configured to, when the issuance signal is input from the alert issuing unit 102, cause the display device to display the issuance of the alert, and the notifying device to produce the alert sound. Further, as described later in detail, the input/output unit 103 is configured to, when information on the recommended operational action is input from a presenting unit 202 of the operation assistance device 200, cause the display device to display a recommended operational action in accordance with the issued alert. The input/output unit 103 is configured to, when the operation device for operating the facility 10 is operated, output an operation signal from the operation device to the operation instruction unit 104. As described later, the input/output unit 103 is configured to output information indicating which recommended operational action is selected from among options of the recommended operational action displayed on the display device to a selection history storage unit 208 of the operation assistance device 200, which will be described later.

The operational action is an action of a final control element 90, which is a device such as a power device or a valve for controlling parts of the facility 10. For example, the operational action of a control valve includes changing the opening degree of the control valve. The operational action of a pump includes turning on or off the pump, or changing the rotational speed of the pump.

In the following description, not only the action of changing the state of each device as described above, but also the action of, in the facility including multiple devices such as a boiler, changing the operating state of the facility, for example changing the load of the boiler or changing the setting value of the steam temperature of each part, is also referred to as the operational action. For example, a reduction in output by decreasing the setting value of the boiler outlet steam temperature and a reduction in turbine heat rate are expressed as changes of the operational action.

The operation instruction unit 104 outputs the operation signal output from the input/output unit 103 to the operation control unit 105.

The operation control unit 105 outputs the control signal to the final control element 90 of the facility 10, based on information indicating the operational state of the facility 10 output from the data acquisition unit 101 and the control signal output from the operation instruction unit 104.

(Operation Assistance Device 200)

The operation assistance device 200 according to some embodiments includes a detecting unit 201, an analysis unit 210, a presenting unit 202, an alert history storage unit 204, an operational data storage unit 205, and an operation history storage unit 206. Further, the operation assistance device 200 according to some embodiments may include an alert issuance criterion modifying unit 203, an alert issuance criterion storage unit 207, and a selection history storage unit 208.

(Detecting Unit 201)

The detecting unit 201 detects issuance of the alert from the alert issuing unit 102 of the facility control device 100. That is, the detecting unit 201 monitors the presence or absence of the alert issuance signal from the alert issuing unit 102 of the facility control device 100. When the issuance signal is input from the alert issuing unit 102, the detecting unit 201 outputs information indicating which of the sensors 80 is related to the issuance signal and information on the type of the alert to the analysis unit 210.

The information on the type of the alert is information indicating what kind of issuance criterion the detected value of the sensor 80 has reached.

For example, when the sensor 80 is a temperature sensor, and the alert issuance criterion is set by upper limit temperature and lower limit temperature, the information on the type of the alert is information indicating that the alert is issued due to reaching the issuance criterion of upper limit temperature, or the alert is issued due to reaching the issuance criterion of lower limit temperature.

For example, when the sensor 80 is a temperature sensor, and the alert issuance criterion is set by a first issuance criterion of upper limit temperature and a second criterion set to a higher temperature than the first issuance criterion, the information on the type of the alert is information indicating that the alert is issued due to reaching the first issuance criterion, or the alert is issued due to reaching the second issuance criterion.

In the following, when the alert issuance criterion is set by the upper limit of the detected value of the sensor 80, the expression that "detected value of sensor 80 reaches issuance criterion" indicates that the detected value of the sensor 80 changes from a value less than the upper limit criterion value to the upper limit criterion value, or exceeds the upper limit criterion value. Further, in the following, when the alert issuance criterion is set by the lower limit of the detected value of the sensor 80, the expression that "detected value of sensor 80 reaches issuance criterion" indicates that the detected value of the sensor 80 changes from a value more than the lower limit criterion value to the lower limit criterion value, or falls below the lower limit criterion value.

Further, when the alert issuance criterion is set only by the upper limit of the detected value of the sensor 80, a range less than the upper limit criterion value is referred to as a normal range. Similarly, when the alert issuance criterion is set only by the lower limit of the detected value of the sensor 80, a range more than the lower limit criterion value is referred to as a normal range. Further, when the alert issuance criterion is set by both the upper limit and the lower limit of the detected value of the sensor 80, a range less than the upper limit criterion value and more than the lower limit criterion value is referred to as a normal range.

For convenience of description, the overview of the alert history storage unit 204, the operational data storage unit 205, and the operation history storage unit 206 will be described prior to the schematic description of the analysis unit 210.

(Alert History Storage Unit 204)

The alert history storage unit 204 stores an issuance history of the alert that has been issued in the past. For example, the alert issuance history stored in the alert history storage unit 204 includes, for each alert issued in the past, information indicating which of the sensors 80 has issued the alert, information on the type of the alert, information on the date and time of issuance, and the date and time when the alert issuance factor was eliminated.

For example, the alert history storage unit 204 stores the above-described information included in the issuance signal output from the alert issuing unit 102 of the facility control device 100 as the alert issuance history. The information included in the issuance signal output from the alert issuing unit 102 is used as structured data when presenting the recommended operational action, as described later.

Further, for example, the alert history storage unit 204 stores information based on a report recorded by the operator of the facility 10 as the issuance history. The report recorded by the operator of the facility 10 includes, for example, daily operation report, trouble report, alert history memo, hand-over document that records the items to be handed over when the operator is replaced, document that records points that the operator noticed when operating the facility 10. In the following, such a report recorded by the operator may be simply referred to as a report.

The report may be, for example, a handwritten report, or an electromagnetic record with the content input by the operator through the input device of the input/output unit 103 of the facility control device 100, i.e., a report created by an electronic method, a magnetic method, or in another way that cannot be recognized by the perception of person.

The information recorded in the report is so-called unstructured data. Therefore, the information recorded in the report is converted into structured data and stored in the alert history storage unit 204 as described below.

Specifically, prior to conversion to structured data, the data creator extracts the content recorded in the report and processes it into data that can be linguistically analyzed. That is, the data creator extracts information indicating which of the sensors 80 has issued the alert, information on the type of the alert, information on the date and time of issuance, and information on the date and time when the alert issuance factor was eliminated, and organizes them as tabular data, for example. Further, the data creator extracts from the report the non-conformity event assumed to be the cause of issuance of the alert, the operational action executed by the operator for eliminating the alert issuance factor, and the name of the operator who responded to the issued alert, and organizes them as tabular data, for example. The data creator associates each extracted data with the issued alert.

The operational action executed by the operator for eliminating the alert issuance factor includes, in addition to the operation of the facility 10, actions such as maintenance for replacing the sensor 80 when there is a problem in the sensor 80 or a signal wire related to issuance of the alert, for example.

The information thus extracted is converted into structured data by a language analysis tool and stored in the alert history storage unit 204.

(Operational Data Storage Unit 205)

The operational data storage unit 205 acquires information indicating the operational state of the facility 10 via the data acquisition unit 101 and stores the information.

(Operation history storage unit 206) The operation history storage unit 206 acquires an operation history of the facility 10 by the operator from the operation control unit 105 of the facility control device 100 and stores the information.

(Overview of Analysis Unit 210)

Figure 2:
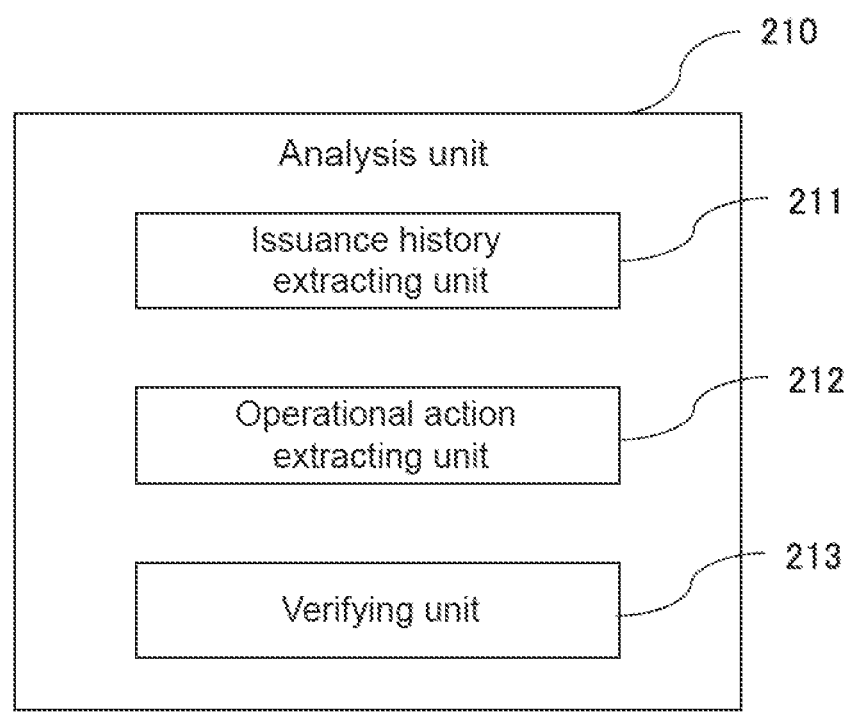
FIG. 2 is a diagram showing a configuration of an analysis unit.

Next, the overview of the analysis unit 210 will be described. FIG. 2 is a diagram showing a configuration of the analysis unit 210. The analysis unit 210 includes an issuance history extracting unit 211, an operational action extracting unit 212, and a verifying unit 213, (Issuance History Extracting Unit 211)

The issuance history extracting unit 211 is configured to extract, from the alert history storage unit 204, an issuance history of the same type of alert as the alert of which the issuance has been detected by the detecting unit 201.

The same type of alert as the alert of which the issuance has been detected by the detecting unit 201 is an alert with respect to the same sensor 80 as the sensor 80 that is related to the issuance, of the same type as the alert that is related to the issuance. Specifically, it is as follows:

For example, the case of the sensor 80 for detecting the steam temperature at the outlet of a primary super-heater 43 of a boiler plant 10A in FIG. 3 described later will be described. This sensor 80 will be referred to as a primary super-heater outlet temperature sensor 83. Further, it is assumed that the alert issuance criterion of the primary super-heater outlet temperature sensor 83 is set by a first issuance criterion of upper limit temperature and a second criterion set to a higher temperature than the first issuance criterion.

For example, if the alert detected by the detecting unit 201 has been issued due to the detected temperature of the primary super-heater outlet temperature sensor 83 reaching the first issuance criterion, the same type of alert as the alert of which the issuance has been detected by the detecting unit 201 includes an alert issued due to the detected temperature of the primary super-heater outlet temperature sensor 83 reaching the first issuance criterion and an alert issued due to the detected temperature of the primary super-heater outlet temperature sensor 83 reaching the second issuance criterion.

Even if the alert issuance criterion for the primary super-heater outlet temperature sensor 83 is set also by the lower limit temperature, an alert issued due to reaching the lower limit issuance criterion does not fall under the same type of alert.

That is, when it is presumed that the factors that cause the detected value to reach the issuance criteria are the same, the alerts issued due to reaching any of the issuance criteria set to different values for the same sensor 80 shall be included in the same type of alert.

(Operational Action Extracting Unit 212)

The operational action extracting unit 212 is configured to extract, from the operation history storage unit 206, an operational action after issuance of the same type of alert extracted by the issuance history extracting unit 211. When there is a plurality of issuance histories of the same type of alert extracted by the issuance history extracting unit 211, the operational action extracting unit 212 is configured to extract, for each alert issuance history, an operational action after issuance of the alert from the operation history storage unit 206.

For example, in the case of the primary super-heater outlet temperature sensor 83, the operational action extracting unit 212 extracts an operational action after issuance of the alert from the operation history storage unit 206 for each issuance history of the alert issued in the past when the first issuance criterion or the second issuance criterion of the primary super-heater outlet temperature sensor 83 is satisfied.

(Verifying Unit 213)

The verifying unit 213 is configured to extract, from the operational data storage unit 205, information indicating the operational state of the facility 10 after the operational action extracted by the operational action extracting unit 212, and verify the influence of the operational action on the operational state of the facility 10. That is, the verifying unit 213 is configured to extract, from the operational data storage unit 205, information indicating the operational state of the facility 10 after the operational action extracted by the operational action extracting unit 212, and verify whether the operational state of the facility 10 has improved due to the operational action.

For example, in the case of the primary super-heater outlet temperature sensor 83, the verifying unit 213 extracts, from the operational data storage unit 205, information including at least the detected value of the primary super-heater outlet temperature sensor 83 as the information indicating the operational state of the facility after the operational action extracted by the operational action extracting unit 212. Further, the verifying unit 213 at least verifies whether the detected value of the primary super-heater outlet temperature sensor 83 has been decreased less than the first issuance criterion or the second issuance criterion by the operational action extracted by the operational action extracting unit 212.

(Presenting Unit 202)

The presenting unit 202 is configured to present the recommended operational action in response to the alert of which the issuance has been detected by the detecting unit 201, based on the operational action extracted by the operational action extracting unit 212 and the influence of the operational action on the operational state of the facility 10 verified by the verifying unit 213. The presenting unit 202 selects, from among the operational action extracted by the operational action extracting unit 212, an operational action that is determined, by the verifying unit 213, to improve the operational state of the facility 10 as the recommended operational action. Further, the presenting unit 202 outputs information on the selected, recommended operational action to the display device of the input/output unit 103 of the facility control device 100.

For example, in the case of the primary super-heater outlet temperature sensor 83, the presenting unit 202 selects, from among the operational action extracted by the operational action extracting unit 212, an operational action that has been verified by the verifying unit 213 to decrease the detected value of the primary super-heater outlet temperature sensor 83 less than the first issuance criterion or the second issuance criterion as the recommended operational action. Further, the presenting unit 202 displays the selected, recommended operational action on the display device of the input/output unit 103 of the facility control device 100.

(Alert Issuance Criterion Modifying Unit 203)

The alert issuance criterion modifying unit 203 is configured to modify the alert issuance criterion. Details of the alert issuance criterion modifying unit 203 will be described later.

(Alert Issuance Criterion Storage Unit 207)

The alert issuance criterion storage unit 207 is configured to store the alert issuance criterion for each of the sensors 80.

(Selection History Storage Unit 208)

As described above, the selection history storage unit 208 is configured to store information indicating which recommended operational action is selected from among options of the recommended operational action displayed on the display device of the input/output unit 103.

(Example of Facility 10)

The facility 10 according to some embodiments may be a small-scale facility such as a small-sized boiler, or may be a large-scale facility such as a power generation plant of an energy company. Hereinafter, a typical boiler plant will be described as an example of the large-scale facility according to some embodiments.

Figure 3:
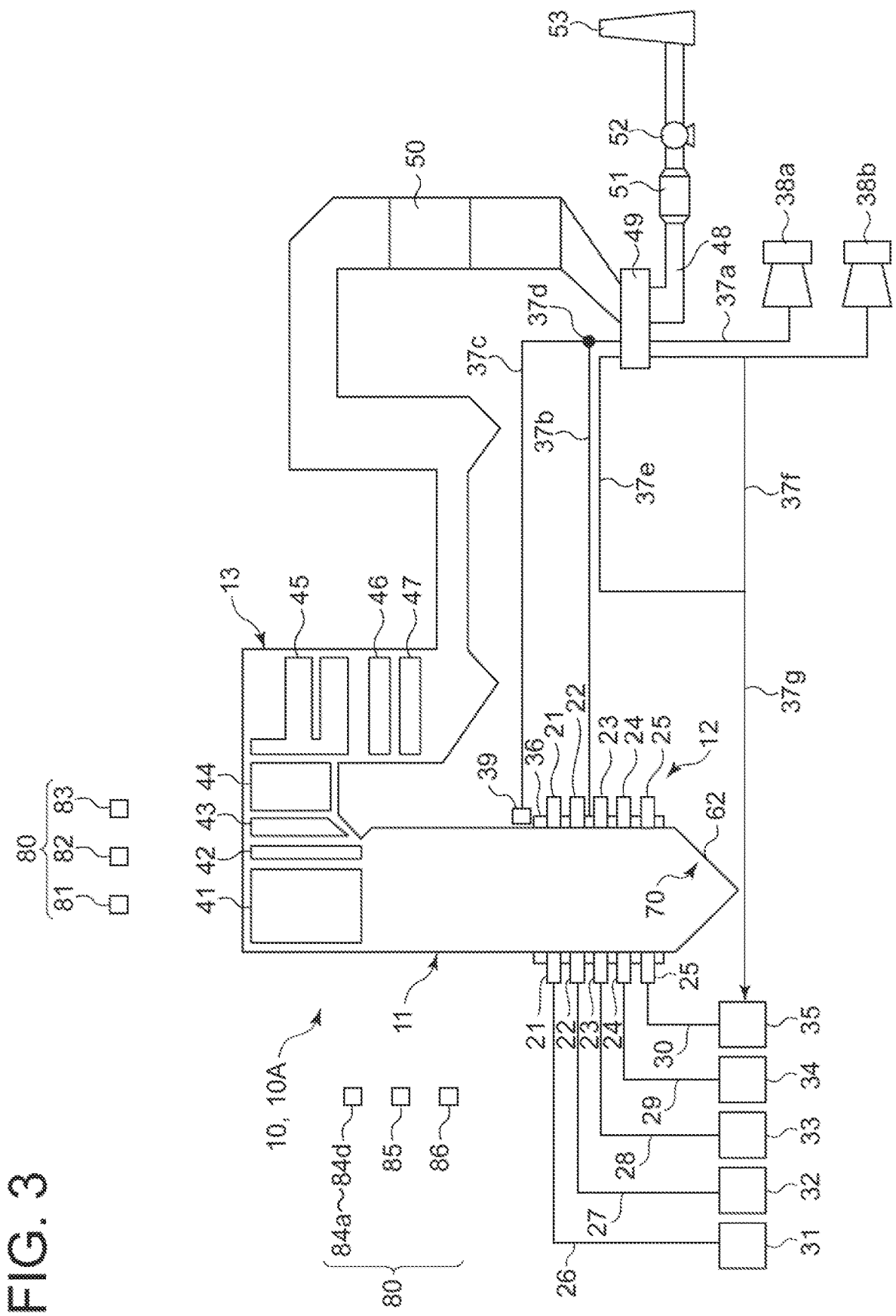
FIG. 3 is an exemplary schematic configuration diagram of a typical boiler plant.

FIG. 3 is an exemplary schematic configuration diagram of a typical boiler plant.

The boiler plant 10A shown in FIG. 3 is a facility used for power generation or heat supply. The boiler plant 10A is a coal fired boiler using pulverized coal obtained by pulverizing coal as a pulverized fuel (solid fuel), which combusts the pulverized coal by a burner of a furnace 11 to produce steam through heat exchange between heat generated by the combustion and feedwater or steam. The fuel is not limited to coal, but may be other solid fuels such as biomass which can be combusted by the boiler. A mixture of various solid fuels, gases, or oil fuels may be used.

The boiler plant 10A includes a furnace 11, a combustion device 12, and a gas duct 13.

The furnace 11 has, for example, a hollow rectangular tubular shape and disposed along the vertical direction. The wall surface of the furnace 11 is composed of steam pipes (heat-transfer tubes) and fins connecting the steam pipes to suppress the temperature increase of the furnace wall by heat exchange with feedwater and steam. Specifically, on the side wall surface of the furnace 11, a plurality of steam pipes, each of which is disposed along the vertical direction, are arranged in the horizontal direction. The fin closes a gap between the steam pipes. At the bottom of the furnace 11, an inclined surface 62 is disposed. The inclined surface 62 is provided with a furnace bottom steam pipe 70 which constitutes the bottom surface.

The combustion device 12 is disposed at a vertically lower portion of the furnace wall of the furnace 11. In the embodiment of FIG. 1, the combustion device 12 has a plurality of burners (for example, 21, 22, 23, 24, 25) mounted on the furnace wall. The burners 21, 22, 23, 24, 25 are arranged at regular intervals along the circumferential direction of the furnace 11, for example. However, the shape of the furnace, the arrangement of the burners, the number of the burners at one stage, and the number of stages are not limited to this embodiment.

The burners 21, 22, 23, 24, 25 are connected to pulverizers (coal pulverizers/mills) 31, 32, 33, 34, 35 via pulverized coal supply pipes 26, 27, 28, 29, 30, respectively. Coal conveyed by a conveying system (not shown) and placed into the pulverizer 31, 32, 33, 34, 35 is pulverized into powder of predetermined size. The coal thus pulverized (pulverized coal) is supplied to the burner 21, 22, 23, 24, 25 via the pulverized coal supply pipe 26, 27, 28, 29, 30 together with the conveying air (primary air).

Further, the furnace 11 has a wind box 36 at the mounted position of each burner 21, 22, 23, 24, 25. One end of an air duct 37b is connected to the wind box 36, and the other end of the air duct 37b is connected at a connection point 37d to an air duct 37a for supplying the air. As a result, the conveying air (primary air) and the combustion air (secondary air) from the air duct 37b are introduced to the furnace 11.

The gas duct 13 is connected to a vertically upper portion of the furnace 11, and a plurality of heat exchangers (41, 42, 43, 44, 45, 46, 47) for producing steam are arranged in the gas duct 13. Thus, when the burners 21, 22, 23, 24, 25 inject a mixture of the pulverized coal fuel and the combustion air into the furnace 11, flame is formed, and combustion gas is generated and flows into the gas duct 13. By heating feedwater and steam flowing through the furnace wall and the heat exchangers (41, 42, 43, 44, 45, 46, 47) by the combustion gas, super-heated steam is produced, and the produced super-heated steam rotationally drives a steam turbine (not shown) and further drives a generator (not shown) connected to a rotational shaft of the steam turbine to generate power.

The plurality of heat exchangers (41, 42, 43, 44, 45, 46, 47) include, for example, a primary super-heater 43, a secondary super-heater 42, a tertiary super-heater 41, and a primary re-heater 45, a secondary re-heater 44, a primary economizer 47, and a secondary economizer 46.

The gas duct 13 is connected to an exhaust gas passage 48, which is provided with a denitration device 50 for purifying the combustion gas, an air heater 49 for performing heat exchange between the air flowing from a forced draft fan 38a to the air duct 37a and the exhaust gas flowing through the exhaust gas passage 48, a dust treatment device 51, and an induced draft fan 52, and provided at the downstream end with a stack 53. The denitration device 50 may not be provided if the exhaust gas standard is satisfied.

The air (primary air) for conveying the pulverized coal is sent from a primary air fan 38b to an air duct 37e passing through an air heater 49 and to an air duct 37g connected to an air duct 37f bypassing the air heater 49. After the air volume of both air ducts 37e, 37f is adjusted and, the air merges and is sent to the pulverizers (mills) 31, 32, 33, 34, 35 via the air duct 37g so that the conveying air (primary air) for the pulverized coal is adjusted to have a predetermined temperature.

The furnace 11 shown in FIG. 3 is a so-called two-stage combustion furnace in which, after fuel excess combustion by the pulverized coal conveying air (primary air) and the combustion air (secondary air) injected from the wind box 36 to the furnace 11, combustion gas (after-air) is newly injected to perform fuel lean combustion. Therefore, the furnace 11 has an after-air port 39. The after-air port 39 is connected to one end of an air duct 37c, and the other end is connected at a connection point 37d to an air duct 37a for supplying the air. When the two-stage combustion system is not adopted, the after-air port 39 may not be provided.

The air sent from the primary air fan 38b to the air duct 37a is heated by heat exchange with the combustion gas by the air heater 49, and is divided at the connection point 37d into the secondary air introduced to the wind box 36 via the air duct 37b and the after-air introduced to the after-air port 39 via the air duct 37c.

Some sensors 80 disposed on the boiler plant 10A shown in FIG. 3 will be described. The sensors 80 of the boiler plant 10A include, for example, a primary super-heater outlet temperature sensor 83, a secondary super-heater outlet temperature sensor 82, and a tertiary super-heater outlet temperature sensor 81. Further, the sensors 80 of the boiler plant 10A include, for example, a front wall outlet metal temperature sensor 84a, a back wall outlet metal temperature sensor 84b, a side wall outlet metal temperature sensors 84c, 84d, a furnace draft sensor 85, and a furnace outlet fluid temperature sensor 86.

The primary super-heater outlet temperature sensor 83 detects the steam temperature at the outlet of the primary super-heater 43. The secondary super-heater outlet temperature sensor 82 detects the steam temperature at the outlet of the secondary super-heater 42. The tertiary super-heater outlet temperature sensor 81 detects the steam temperature at the outlet of the tertiary super-heater 41.

The front wall outlet metal temperature sensor 84a detects the metal temperature at the outlet of a heat-transfer tube constituting the front wall of the furnace 11. The back wall outlet metal temperature sensor 84b detects the metal temperature at the outlet of a heat-transfer tube constituting the back wall of the furnace 11. The side wall outlet metal temperature sensor 84c detects the metal temperature at the outlet of a heat-transfer tube constituting one side wall of the furnace 11. The side wall outlet metal temperature sensor 84d detects the metal temperature at the outlet of a heat-transfer tube constituting the other side wall of the furnace 11.

The furnace draft sensor 85 detects the pressure inside the furnace 11. The furnace outlet fluid temperature sensor 86 detects the temperature of furnace outlet fluid.

(Operation Assistance Method)

Hereinafter, the operation assistance method in the facility 10 according to some embodiments will be described.

Figure 4:
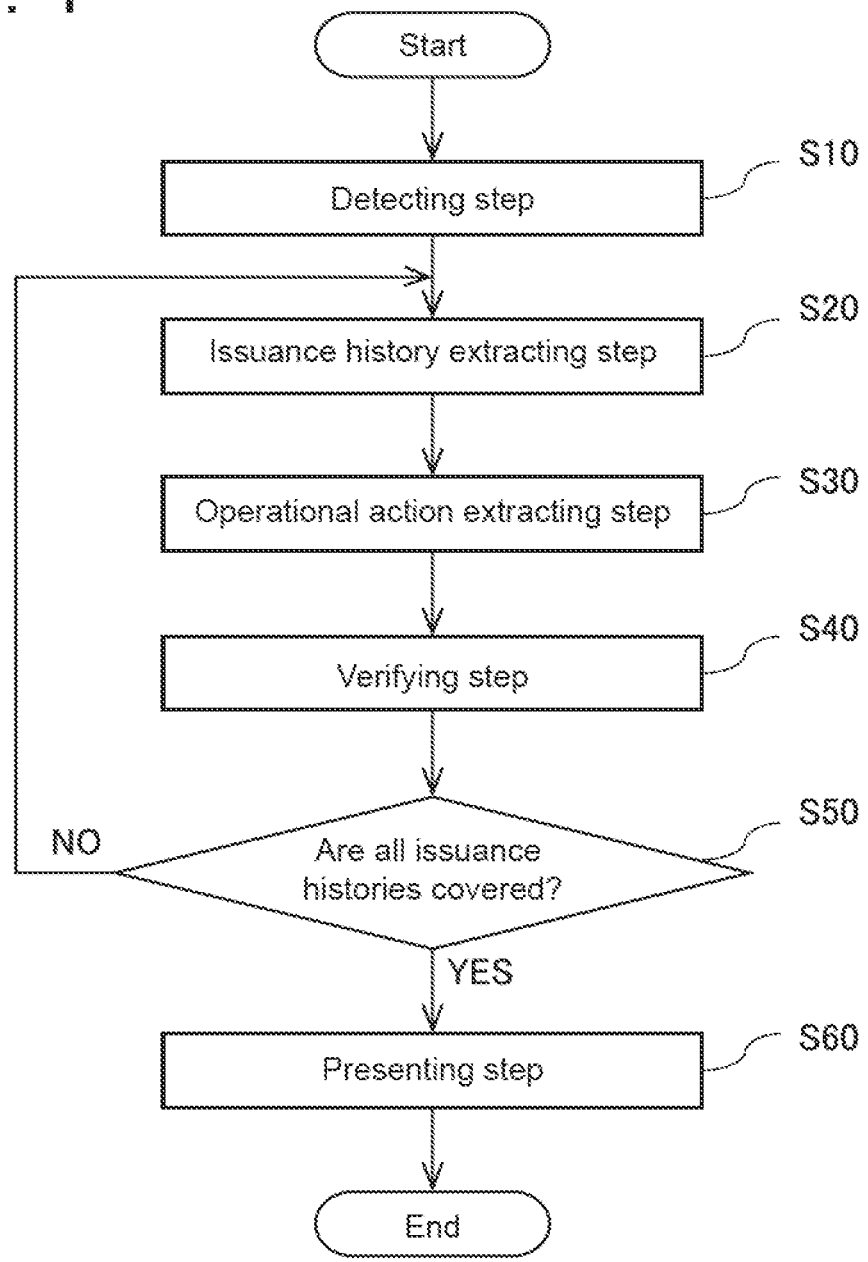
FIG. 4 is a flowchart showing the process of an operation assistance method in a facility according to some embodiments.

FIG. 4 is a flowchart showing the process of the operation assistance method in the facility 10 according to some embodiments.

The operation assistance method according to some embodiments includes a detecting step S10, an issuance history extracting step S20, an operational action extracting step S30, a verifying step S40, and a presenting step S60.

The detecting step S10 is a step of detecting issuance of the alert from the alert issuing unit 102 of the facility control device 100 by the detecting unit 201 of the operation assistance device 200. As described above, when the issuance signal is input from the alert issuing unit 102, the detecting unit 201 outputs information indicating which of the sensors 80 is related to the issuance signal and information on the type of the alert to the analysis unit 210.

The issuance history extracting step S20 is a step of extracting, from the alert history storage unit 204, an issuance history of the same type of alert as the alert of which the issuance has been detected in the detecting step S10 by the issuance history extracting unit 211 of the analysis unit 210. In the issuance history extracting step S20, the issuance history extracting unit 211 extracts, from the alert history storage unit 204, an issuance history of the same type of alert as the alert of which the issuance has been detected in detecting step S10, based on the information output from the detecting unit 201 in the detecting step S10.

The operational action extracting step S30 is a step of extracting, from the operation history storage unit 206, an operational action after issuance of the same type of alert by the operational action extracting unit 212 of the analysis unit 210. In the operational action extracting step S30, the operational action extracting unit 212 reads the issuance date and time of all alerts included in the issuance history extracted in the issuance history extracting step S20. Then, the operational action extracting unit 212 extracts an operational action in a specified period after the read issuance date and time from the operation history storage unit 206. The specified period may be a previously set period, for example 1 hour, or may be a period until the issued alert is canceled.

The verifying step S40 is a step of extracting, from the operational data storage unit 205, information indicating the operational state of the facility 10 after the operational action extracted in the operational action extracting step S30, and verifying the influence of the operational action on the operational state of the facility 10 by the verifying unit 213 of the analysis unit 210. In the verifying step S40, the verifying unit 213 extracts, from the operational data storage unit 205, information indicating the operational state of the facility 10 in a specified period after the operational action extracted by the operational action extracting unit 212 in the operational action extracting step S30. The specified period may be a period, with a certain margin, from the time when the operational action is performed to the time when it is estimated that the information indicating the operational state of the facility 10 changes due to the operational action.

Then, the verifying unit 213 verifies whether the operational state of the facility 10 has improved due to the operational action, based on the information indicating the operational state of the facility 10 extracted as described above. For example, the verifying unit 213 determines that, if the detected value of the sensor 80 has no longer satisfied the issuance criterion within the specified period after the operational action, the operational state of the facility 10 has improved due to the operational action, based on the information indicating the operational state of the facility 10 extracted as described above. Further, for example, the verifying unit 213 determines that, if the detected value of the sensor 80 has still satisfied the issuance criterion for the specified period after the operational action, the operational state of the facility 10 has not improved due to the operational action, based on the information indicating the operational state of the facility 10 extracted as described above.

Once the verifying step S40 is performed, the process proceeds to step S50, and the analysis unit 210 determines whether all issuance histories of the same type of alert are covered, i.e., whether all issuance histories of the same type of alert as the alert of which issuance has been detected in the detecting step S10 have been extracted from the alert history storage unit 204.

If the determination is negative in step S50, the process returns to the issuance history extracting step S20.

If the determination is positive in step S50, the process proceeds to the presenting step S60.

The presenting step S60 is a step of presenting the recommended operational action in response to the alert of which the issuance has been detected in the detecting step S10, based on the operational action extracted in the operational action extracting step S30 and the influence of the operational action on the operational state of the facility 10 verified in the verifying step S40. In the presenting step S60, the analysis unit 210 selects, from among the operational action extracted in the operational action extracting step S30, an operational action that is determined, in the verifying step S40, to improve the operational state of the facility 10, as the recommended operational action. Then, the presenting unit 202 outputs information on the recommended operational action selected in the analysis unit 210 to the display device of the input/output unit 103 of the facility control device 100.

Figure 5:
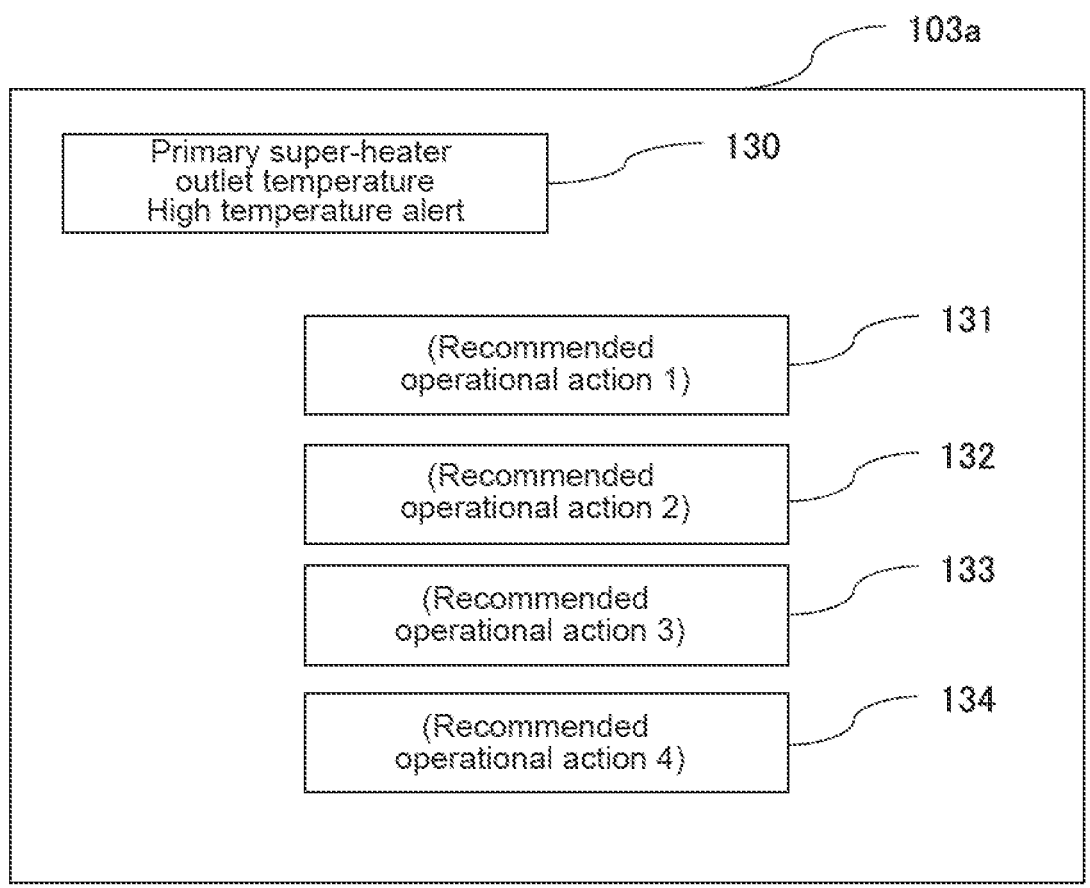
FIG. 5 is a diagram showing an example of a screen of a recommended operational action displayed on a display device of an input/output unit of a facility control device.

FIG. 5 is a diagram showing an example of a screen of the recommended operational action displayed on the display device of the input/output unit 103 of the facility control device 100. For example, when the alert for notifying that the detected value of the primary super-heater outlet temperature sensor 83 reaches the first issuance criterion is issued in the detecting step S10, the display device 103*a* of the input/output unit 103 displays a screen 130 indicating the type of the issued alert. Further, the display device 103*a* of the input/output unit 103 displays screens 131 to 134 indicating recommended operational actions in response to the issued alert. The recommended operational actions 1 to 4 on the screens 131 to 134 are specific recommended operational actions.

Thus, by performing any of the recommended operational actions displayed on the display device 103*a*, the operator can eliminate the malfunction event which is the cause of issuance of the alert. In order to perform any of the recommended operational actions displayed on the display device 103*a*, the operator performs the operation necessary to execute the recommended operational action desired to be performed. Further, for example, the operator may select any of the screens 131 to 134 displayed on the display device 103*a* to execute the selected, recommended operational action.

As described above, with the operation assistance method according to some embodiments, when issuance of the alert is detected, it is possible to present the recommended operational action for the non-conformity event which is the cause of the issuance of the alert. The recommended operational action is an operational action of which the influence on the operational state is verified, based on information indicating the operational condition of the facility and the operation history in the past. Thus, even the inexperienced operator can take an appropriate response to the nonconformity event by referring to the presented, recommended operational action.

As the scale of the facility 10 increases, it is difficult to derive an appropriate response to the non-conformity event in a short time. In this regard, with the operation assistance method according to some embodiments, since the recommended operational action to the issued alert can be rapidly provided, it is possible to rapidly respond to the recommended operational action.

(Case where Plurality of Alerts are Issued at Same Time)

In the facility 10 according to some embodiments, a plurality of alerts may be issued at the same time. For example, in the boiler plant 10A shown in FIG. 3, some cases where a plurality of alerts are issued at the same time will be described.

(1) Case where leak occurs in heat-transfer tube constituting wall surface of furnace 11 (furnace wall surface)

(1-1) Sign

When leak occurs in the heat-transfer tube of the furnace wall, as a sign, the vaporization of leaked water causes fluctuations in the pressure inside the furnace (furnace draft). If the amount of leak is small at the early stage of leakage occurrence, even when the pressure inside the furnace fluctuates, the alert issuance criterion with respect to the furnace draft sensor 85 may not be reached, so the alert with respect to the furnace draft sensor 85 may not be issued.

(1-2) Issued Alert

At the early stage of leakage occurrence, the leak reduces the flow rate of a fluid flowing in the heat-transfer tube, so that the metal temperature rises at the outlet of the heat-transfer tube in which the leak has occurred. Accordingly, at the early stage of leakage occurrence, among the metal temperature sensors 84*a* to 84*d*, a high temperature alert is issued with respect to the metal temperature sensor for the heat-transfer tube in which the leak has occurred.

Then, as the amount of leak increases, the fluctuation range of the pressure in the furnace increases, so that a low or high pressure alert is issued with respect to the furnace draft sensor 85.

(1-3) Progress Speed of Non-Conformity Event

When leak occurs in the heat-transfer tube of the furnace wall, the non-conformity event progresses faster than when the amount of heat absorbed by the furnace wall increases, as will be described later.

(1-4) Response

When leak occurs in the heat-transfer tube of the furnace wall and the amount of leak is small, operations to reduce the boiler load or to increase the amount of feedwater are rapidly performed. Further, abnormal noise in the furnace is checked.

When leak occurs in the heat-transfer tube of the furnace wall and the amount of leak is large, the boiler is rapidly stopped.

(2) Case where Heat Absorption Amount of Furnace Wall Increases (2-1) Sign

When the heat absorption amount of the furnace wall increases, as a sign, the temperature of the furnace outlet fluid rises.

(2-2) Issued Alert

At the early stage of increase in heat absorption amount of the furnace wall, the temperature of the furnace outlet fluid rises, so that a high temperature alert is issued with respect to the furnace outlet fluid temperature sensor 86.

Then, steam heated with the increase in heat absorption amount of the furnace wall flows into the primary super-heater 43, so that a high temperature alert is issued with respect to the primary super-heater outlet temperature sensor 83.

(2-3) Progress Speed of Non-Conformity Event

When the heat absorption amount of the furnace wall increases, the non-conformity event progresses slower than when leak occurs in the heat-transfer tube of the furnace wall as described above.

(2-4) Response

When the heat absorption amount of the furnace wall increases, an operation to increase the bypass amount of an eco-bypass (not shown) for circulating the combustion exhaust gas by bypassing the economizers 46, 47 is performed. In addition, the burner tilt is changed so that the combustion zone in the furnace 11 is shifted to the downstream side, and the supply amount of ammonia is increased to suppress the increase of nitrogen oxides in the combustion exhaust gas.

(3) Case where Leak Occurs in Heat-Transfer Tube of Primary Super-Heater 43

(3-1) Sign

When leak occurs in the heat-transfer tube of the primary super-heater 43, as a sign, unbalance between the feedwater flow rate and the main steam flow rate increases. Further, the steam temperature at the outlet of the primary super-heater 43 dramatically rises.

(3-2) Issued Alert

The leak reduces the flow rate of steam flowing in the heat-transfer tube, so that the steam temperature dramatically rises at the outlet of the primary super-heater 43. Accordingly, at the early stage of leakage occurrence, a high temperature alert is issued with respect to the primary super-heater outlet temperature sensor 83.

Then, since the flow rate of steam is reduced also in the secondary super-heater 42 and the tertiary super-heater 41, the steam temperature dramatically rises at the outlets of the secondary super-heater 42 and the tertiary super-heater 41. Accordingly, high temperature alerts are issued with respect to the secondary super-heater outlet temperature sensor 82 and the tertiary super-heater outlet temperature sensor 81.

(3-3) Progress Speed of Non-Conformity Event

When leak occurs in the heat-transfer tube of the primary super-heater 43, the non-conformity event progresses faster than when the amount of heat absorbed by the furnace wall increases, as described above.

(3-4) Response

When leak occurs in the heat-transfer tube of the primary super-heater 43, an operation to reduce the boiler load is performed.

For example, in the above-described examples, when the amount of heat absorbed by the furnace wall increases, or when leak occurs in the heat-transfer tube of the primary super-heater 43, a high temperature alert is issued with respect to the primary super-heater outlet temperature sensor 83. Thus, the non-conformity event in the facility 10 assumed to be the cause of issuance of the alert may not be limited to one event. Therefore, in the case where one alert is issued, multiple non-conformity events may be considered, and the operational action for eliminating these non-conformity events may differ for each non-conformity event.

In such a case, for example, it is conceivable to present different recommended operational actions for individual non-conformity events. However, in this case, the recommended operational action effective for eliminating the actually occurring non-conformity event may be a part of the presented plurality of recommended operational actions.

Meanwhile, as described above, in the case where a plurality of alerts are issued at the same time, there may be a non-conformity event common to the issued alerts. Therefore, in the case where a plurality of alerts are issued at the same time, by extracting, for each of the alerts, the operational action that can eliminate the non-conformity event assumed to be the cause of issuance of the alert, it is possible to narrow down the operational actions that can eliminate the common non-conformity event for which the alerts are issued.

Therefore, in the operation assistance method according to some embodiments, when a plurality of different alerts are issued at the same time, the recommended operational action is presented as follows.

Specifically, when a plurality of different alerts are detected at the same time in the detecting step S10, in the issuance history extracting step S20, the issuance history extracting unit 211 of the analysis unit 210 extracts an issuance history of the same type of alert as each of the plurality of different alerts, from the alert history storage unit 204.

In the operational action extracting step S30, the operational action extracting unit 212 of the analysis unit 210 extracts an operational action after issuance of the same type of alert for each of the plurality of different alerts, from the operation history storage unit 206.

In the verifying step S40, the verifying unit 213 of the analysis unit 210 verifies the influence of each operational action extracted in the operational action extracting step S30 on the operational state of the facility 10. Incidentally, when a plurality of different alerts are detected at the same time in the detecting step S10, in the verifying step S40, according to the history of alerts issued in the past, if alerts having the same combination as the plurality of different alerts detected in the detecting step S10 had been issued at the same timing as each of the different alerts detected in the detecting step S10, the verifying unit 213 of the analysis unit 210 verifies the influence, of the operational action which had been executed in response to the alerts, on the operational state of the facility 10.

In the history of alerts issued in the past, the alerts having the same combination as the plurality of different alerts of which the issuance has been detected in the detecting step S10 are alerts having the same combination of the sensors 80 as the sensors 80 related to the issuance, of the same type as the alerts related to the issuance. For example, in the case where the heat absorption amount of the furnace wall increases as described above, a high temperature alert is issued with respect to the furnace outlet fluid temperature sensor 86, and a high temperature alert is issued with respect to the primary super-heater outlet temperature sensor 83. Therefore, if a combination of the plurality of different alerts of which the issuance has been detected in the detecting step S10 is a high temperature alert with respect to the furnace outlet fluid temperature sensor 86 and a high temperature alert with respect to the primary super-heater outlet temperature sensor 83, the alerts having the same combination are a high temperature alert with respect to the furnace outlet fluid temperature sensor 86 and a high temperature alert with respect to the primary super-heater outlet temperature sensor 83.

Further, in the history of alerts issued in the past, issuing at the same timing as each of the different alerts detected in the detecting step S10 means that, for example, the order in which the different alerts had been issued is the same as the order in which the different alerts detected in the detecting step S10 has been issued.

In the presenting step S60, the presenting unit 202 presents the recommended operational action, in consideration of each of the operational actions extracted in the operational action extracting step S30, each of the influences verified in the verifying step S40, a combination of the plurality of different alerts of which the issuance has been detected in the detecting step S10, and a timing when each of the plurality of different alerts has been issued. That is, in the presenting step S60, the presenting unit 202 presents, among the operational actions verified in the verifying step S40 in consideration of a combination of the different alerts detected in the detecting step S10 and the timing when each of the different alerts has been issued, an operational action that is determined to improve the operational state of the facility 10, as the recommended operational action.

Thus, with the operation assistance method according to some embodiments, by considering the combination of the plurality of alerts, it is possible to present a more appropriate recommended operational action.

(Order in which Recommended Operational Actions are Present)

In the operation assistance method according to some embodiments, as described above, when a plurality of recommended operational actions are presented, an order in which the recommended operational actions are presented may be determined according to the priority of the recommended operational actions.

Figure 6:
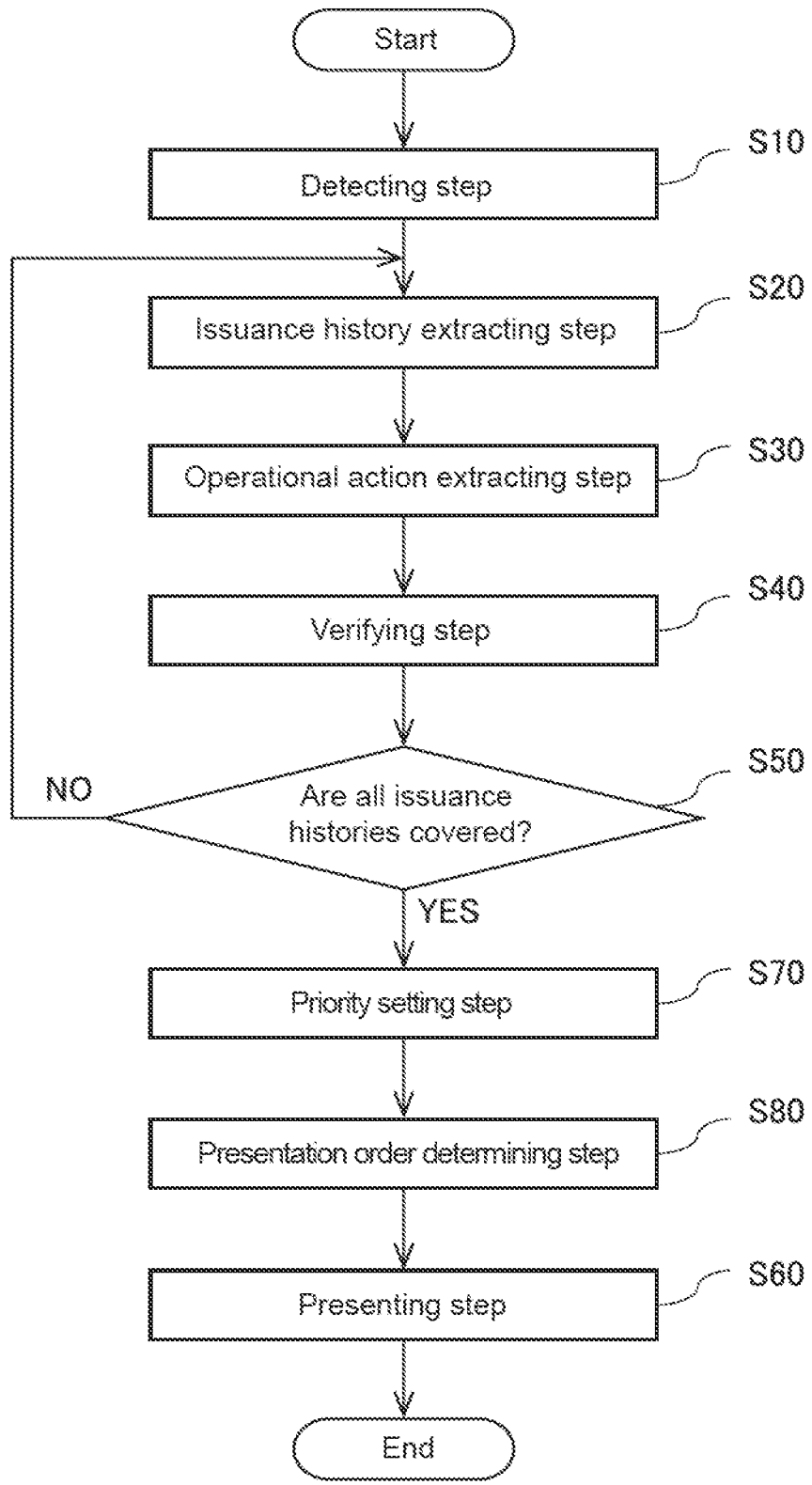
FIG. 6 is a flowchart showing the process of the operation assistance method when the order of presenting recommended operational actions is determined according to the priority of the recommended operational actions.

FIG. 6 is a flowchart showing the process of the operation assistance method when the order in which recommended operational actions are presented is determined according to the priority of the recommended operational actions.

The operation assistance method whose process is shown in FIG. 6 includes, in addition to the process of the operation assistance method shown in FIG. 4, a priority determining step S70, and a presentation order determining step S80 between the step S50 and the presenting step S60.

In the operation assistance method shown in FIG. 6, the process from the detecting step S10 to the determining step S50 is the same as the process in FIG. 4.

If the determination is positive in step S50, the process proceeds to the priority determining step S70. The priority determining step S70 is a step of setting the priority of the recommended operational actions. In the priority determining step S70, the analysis unit 210 selects, from among the operational actions extracted in the operational action extracting step S30, the operational action that is determined, in the verifying step S40, to improve the operational state of the facility 10, as the recommended operational action. Further, for example, for each of the selected recommended operational actions, the analysis unit 210 estimates a time required to improve the operational state of the facility 10 after the execution of the recommended operational action, and sets the priority of the recommended operational actions such that the shorter the required time, the higher the priority of the recommended operational action.

The presentation order determining step S80 is a step of determining an order in which the recommended operational actions are presented in the presenting step S60, according to the priority of the recommended operational actions. In the presentation order determining step S80, the presenting unit 202 sets the presentation order of the recommended operational actions such that the recommended operational action with high priority is displayed above the recommended operational action with low priority on the display device 103a of the input/output unit 103.

In the operation assistance method whose process is shown in FIG. 6, in the presenting step S60, the presenting unit 202 outputs information on the recommended operational action to the display device 103a of the input/output unit 103 such that the recommended operational actions are displayed on the display device 103a of the input/output unit 103 in the presentation order set in the presentation order determining step S80.

As a result, the recommended operational action with high priority is displayed above the recommended operational action with low priority on the display device 103a of the input/output unit 103.

Thus, with the operation assistance method whose process is shown in FIG. 6, since the plurality of recommended operational actions are presented in an order according to the priority, even if the plurality of recommended operational actions are presented, the facility operator can easily determine which recommended operational action is desirable.

In the above description, in the priority determining step S70, for each of the selected recommended operational actions, the analysis unit 210 estimates a time required to improve the operational state of the facility 10 after the execution of the recommended operational action, and sets the priority of the recommended operational actions such that the shorter the required time, the higher the priority of the recommended operational action. However, the present invention is not limited thereto.

For example, in the priority determining step S70, the analysis unit 210 may set, for each of the selected recommended operational actions, the priority of the recommended operational action that is unlikely to induce issuance of a different alert from the alert detected this time by the detecting unit 201 to be higher than the priority of the recommended operational action that may induce issuance of the different alert.

Alternatively, for example, in the priority determining step S70, the analysis unit 210 may set, for each of the selected recommended operational actions, the priority of the recommended operational action that can prevent the alert detected this time by the detecting unit 201 from being issued again to be higher than the priority of the recommended operational action that may cause the same alert to be issued again.

Alternatively, for example, in the priority determining step S70, the analysis unit 210 may set, for each of the selected recommended operational actions, the priority of the recommended operational action that is easy to operate to be higher than the priority of the recommended operational action that is not easy to operate.

Alternatively, for example, in the priority determining step S70, the analysis unit 210 may set the priority of the recommended operational action that is effective in eliminating the malfunction event but is difficult to perform due to operational constraints compared with the other recommended operational actions to be lower than the priority of the other recommended operational actions. For example, taking the boiler plant 10A shown in FIG. 3 as an example, the case where the boiler plant 10A is a power plant, and an alert is issued when the power supply and demand is tight, for example in the afternoon hours in summer, will be considered. In this case, even if the most effective recommended operational action for the malfunction event which is the cause of alert issuance is to reduce the boiler load, it is difficult to execute this action since it causes a decrease in power generation amount. In such a case, the analysis unit 210 may be configured to acquire information such as the power supply and demand status, and if it is determined that the power supply and demand is tight, set the priority of the operational action for reducing the boiler load to be lower than the priority of the other recommended operational actions. Further, the analysis unit 210 may be configured to, if it is determined that the power supply and demand is not tight, set the priority of the operational action for reducing the boiler load to be higher than the priority of the other recommended operational actions.

In the priority determining step S70, the priority of the recommended operational action for avoiding a serious failure of the facility 10 may be set to be higher than the other recommended operational actions. For example, regarding a certain sensor 80, when the issuance criterion is set by both the upper limit and the lower limit of the detected value of the sensor 80, it is possible that the risk differs between the case where the detected value of the sensor 80 exceeds the upper limit of the normal range and the case where it falls below the lower limit of the normal range. Specifically, for example, when the detected value of the sensor 80 changes so as to exceed the upper limit criterion value, a trip of the facility 10 may occur, while when the detected value of the sensor 80 changes so as to fall below the lower limit criterion value, a trip of the facility 10 may not occur. In this case, in the priority determining step S70, the analysis unit 210 may set the priority of the recommended operational action in response to the alert issued when the detected value of the sensor 80 reaches the upper limit criterion value to be higher than the priority of the recommended operational action in response to the alert issued when the detected value of the sensor 80 reaches the lower limit criterion value.

Thus, it is possible to easily avoid a serious failure of the facility 10.

In the priority determining step S70, the priority of the recommended operational actions may be set based on an execution history of the recommended operational action in the past. Specifically, for example, among the presented, recommended operational actions, a history of the recommended operational action selected and executed by the operator may be stored, and the priority of the recommended operational actions may be set based on this history.

Figure 7:
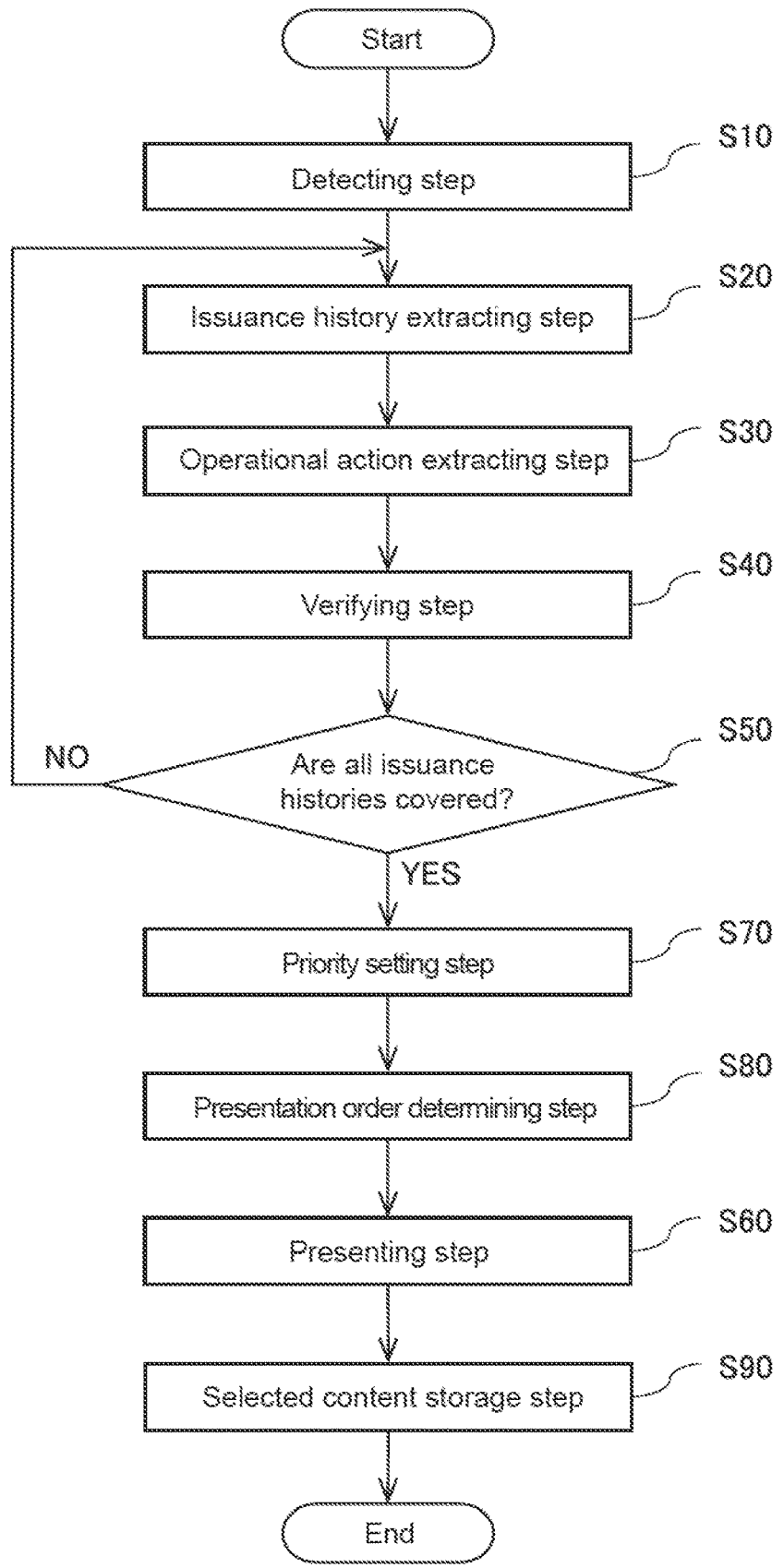
FIG. 7 is a flowchart showing the process of the operation assistance method when the priority of recommended operational actions is set based on a past execution history of the recommended operational action.

FIG. 7 is a flowchart showing the process of the operation assistance method when the priority of recommended operational actions is set based on the past execution history of the recommended operational action.

The operation assistance method whose process is shown in FIG. 7 includes, in addition to the process of the operation assistance method shown in FIG. 6, a selected content storage step S90 after the presenting step S60.

In the operation assistance method shown in FIG. 7, the process from the detecting step S10 to the presenting step S60 is the same as the process in FIG. 6 except the priority determining step S70.

The selected content storage step S90 is a step of storing an execution history of the recommended operational action executed in response to the issued alert in association with the alert. In the selected content storage step S90, the selection history storage unit 208 of the operation assistance device 200 stores the recommended operational action selected and executed by the operator in association with the alert of which the issuance is detected in the detecting step S10. As described above, the input/output unit 103 is configured to output information indicating which recommended operational action on the display device 103a is selected to the selection history storage unit 208. The input/output unit 103 according to some embodiments is configured to output, in addition to the information indicating which recommended operational action on the display device 103a is selected, information for identifying the operator who made the selection to the selection history storage unit 208. Further, the selection history storage unit 208 stores, in addition to the recommended operational action selected by the operator, the information for identifying the operator who made the selection in association with the alert of which the issuance is detected in the detecting step S10. In the following, the information for identifying the operator is also simply referred to as operator ID.

Then, when a new alert is issued, the detecting step S10 to the step S50 shown in FIG. 7 are executed. If the determination is positive in step S50, the process proceeds to the priority determining step S70.

In the priority determining step S70 of FIG. 7, the analysis unit 210 selects, from among the operational actions extracted in the operational action extracting step S30, the operational action that is determined, in the verifying step S40, to improve the operational state of the facility 10, as the recommended operational action. Further, for each selected recommended operational action, the analysis unit 210 refers to the selection history of the recommended operational action, i.e., the execution history of the recommended operational action stored in the selection history storage unit 208, and sets the priority of the recommended operational actions such that the priority of the frequent recommended operational action in the execution history to be higher than the priority of the infrequent recommended operational action.

Thus, it is possible to set the priority of the recommended operational action that has been performed frequently in the past to be higher than the priority of the recommended operational action that has been performed infrequently in the past. This makes it easier for the operator to select the recommended operational action that has been frequently performed in the past.

In the priority determining step S70 of FIG. 7, the priority of the recommended operational actions may be determined based on the selection history of the recommended operational action selected in the past by the operator who will select the recommended operational action in response to the alert of which the issuance is detected this time by the detecting unit 201. In this case, in the priority determining step S70 of FIG. 7, the analysis unit 210 selects, from among the operational actions extracted in the operational action extracting step S30, the operational action that is determined, in the verifying step S40, to improve the operational state of the facility 10, as the recommended operational action. Further, the analysis unit 210 acquires the operator ID of the current operator, i.e., the operator who will select the recommended operational action to be presented later, from the input/output unit 103 of the facility control device 100. Further, for each selected recommended operational action, the analysis unit 210 refers to, among the selection history of the recommended operational action stored in the selection history storage unit 208, the selection history of the recommended operational action that is associated with the acquired operator ID. Further, the analysis unit 210 sets the priority of the recommended operational actions such that the priority of the frequent recommended operational action in the selection history to be higher than the priority of the infrequent recommended operational action.

Thus, it is possible to facilitate the selection of the recommended operational action preferred by the operator who selects the recommended operational action from the plurality of recommended operational actions.

In the priority determining step S70 of FIG. 7, the priority of the recommended operational actions may be determined based on the selection history of the recommended operational action selected in the past by the experienced operator. In this case, in the priority determining step S70 of FIG. 7, the analysis unit 210 selects, from among the operational actions extracted in the operational action extracting step S30, the operational action that is determined, in the verifying step S40, to improve the operational state of the facility 10, as the recommended operational action. Further, for each selected recommended operational action, the analysis unit 210 refers to, among the selection history of the recommended operational action stored in the selection history storage unit 208, the selection history of the recommended operational action that is associated with the operator ID of the experienced operator. The operator ID of the experienced operator may be previously stored in the selection history storage unit 208, for example.

Further, the analysis unit 210 sets the priority of the recommended operational actions such that the priority of the frequent recommended operational action in the selection history to be higher than the priority of the infrequent recommended operational action.

Thus, it is possible to facilitate the selection of the recommended operational action selected by the experienced operator from the plurality of recommended operational actions.

In the priority determining step S70, the analysis unit 210 may set the priority of the recommended operational action that has not been executed to be lower than the priority of the recommended operational action that has been executed.

(Case where Alert for which Recommended Operational Action is Presented is Limited in Advance)

For example, there may be a case where the operator desires the presentation of recommended operational action for some expected alerts but does not desire the presentation of the recommended operational action for other alerts.

In such a case, the operation assistance method according to another embodiment described below, the recommended operational action is presented only in response to the alert that has been previously selected. Specifically, in the operation assistance method according to another embodiment, for example, in the detecting step S10 of the flowchart shown in FIG. 4, 6, or 7, when the issuance signal is input from the alert issuing unit 102, the detecting unit 201 determines whether this issuance signal is the issuance signal of the previously selected alert.

If it is determined that the issuance signal is the signal of the previously selected alert, the detecting unit 201 outputs information indicating which of the sensors 80 is related to the issuance signal and information on the type of the alert to the analysis unit 210. Accordingly, the steps after the issuance history extracting step S20 are performed, and the recommended operational action is presented for the previously selected alert.

Meanwhile, if it is determined that the issuance signal is not the signal of the previously selected alert, the detecting unit 201 does not output information indicating which of the sensors 80 is related to the issuance signal and information on the type of the alert to the analysis unit 210. Accordingly, the steps after the issuance history extracting step S20 are not performed, and the recommended operational action is not presented.

Thus, by previously setting the alert for which the operator desires the presentation of the recommended operational action, the recommended operational action is presented only to the alert for which the operator desires the presentation of the recommended operational action, so that the information needed by the operator can be provided.

(Check of Validity of Alert Issuance)

There may be a case where the issued alerts include an inappropriate alert, for example There are various possible causes for issuing an inappropriate alert, as exemplified below.

For example, the issuance criterion may not be appropriate. That is, like the case where the issuance criterion is set to the safe side more than necessary, it is conceivable that the issuance criterion value is set to a value that unnecessarily narrows the original normal range.

Further, when the signal wire for transmitting the detection signal of the sensor 80 is about to be disconnected, or when the signal wire for transmitting the detection signal of the sensor 80 has a connection failure, it is conceivable that the detected value of the sensor 80 acquired by the data acquisition unit 101 is unstable.

It is required to suppress issuance of an inappropriate alert due to such factors.

Therefore, in the operation assistance method according to an embodiment described below, the issuance of an inappropriate alert is suppressed as described above, FIG. 8 is a flowchart showing the process for determining the validity of issuance of the alert. The operation assistance method according to the embodiment shown in FIG. 8 includes an issuance history extracting step S110, a validity analysis step S120, and a validity determining step S130.

The issuance history extracting step S110 is a step of extracting the alert issued in the past from the issuance history stored in the alert history storage unit 204. In the issuance history extracting step S110, the issuance history extracting unit 211 of the analysis unit 210 of the operation assistance device 200 selects any of the plurality of sensors 80, and extracts the alert issuance history regarding the selected sensor 80 from the alert history storage unit 204. When a plurality of issuance criteria are set for the sensor 80, the issuance history is extracted for each issuance criterion. In the following, for convenience of description, the case where only one issuance criterion is set for the sensor 80 will be described. Further, for convenience of description, the alert regarding the sensor 80 of which validity of issuance is to be checked is referred to as a first alert. Further, in the following, the selected sensor 80 is referred to as a validity check target sensor.

That is, in the issuance history extracting step S110, the issuance history extracting unit 211 of the analysis unit 210 of the operation assistance device 200 extracts the issuance history of the first alert from the alert history storage unit 204.

Figure 9:
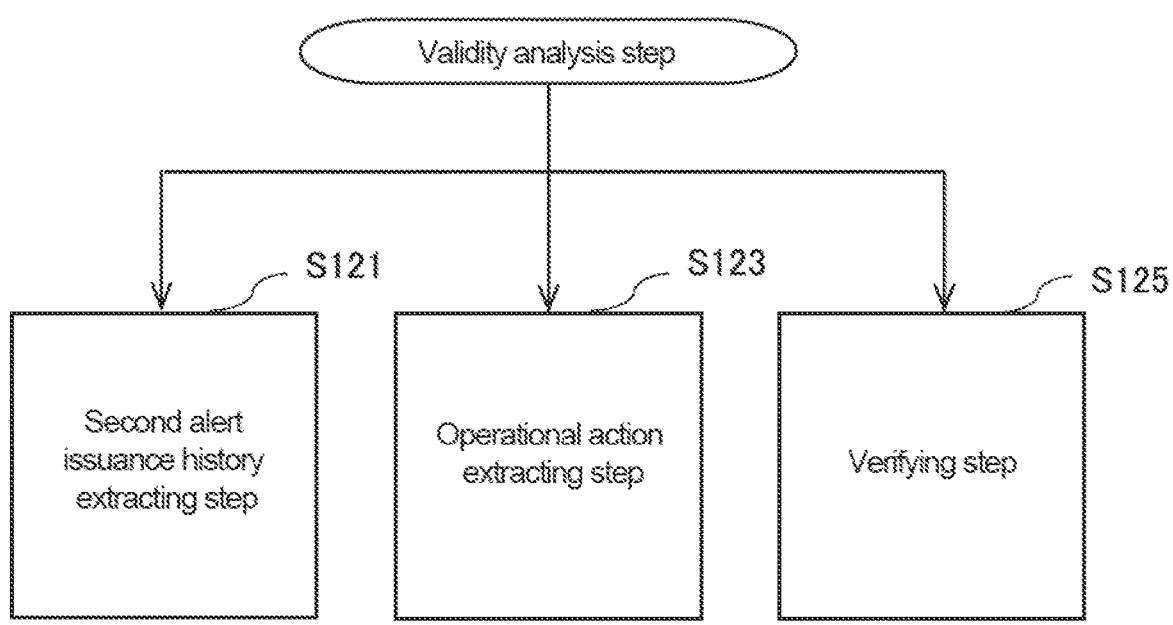
FIG. 9 is a diagram for describing details of the validity analysis step.

FIG. 9 is a diagram for describing details of the validity analysis step S120. The validity analysis step S120 is a step of performing at least one of a second alert issuance history extracting step S121, an operational action extracting step S123, or a verifying step S125.

The second alert issuance history extracting step S121 is a step of extracting a history of an alert issued at the same time as the first alert that has been issued in the past from the issuance history stored in the alert history storage unit 204. For convenience of description, the alert issued at the same time as the first alert that has been issued in the past is referred to as a second alert. In the second alert issuance history extracting step S121, the issuance history extracting unit 211 of the analysis unit 210 extracts the second alert issued at the same time as the first alert extracted in the issuance history extracting step S110, based on information on the issuance date and time of the first alert issued in the past.

In this embodiment, a period regarded as the same time as the first alert is issued is from 1 hour before to 1 hour after the issuance time of the first alert. However, the period regarded as the same time as the first alert is issued may be set appropriately according to the responsiveness of the validity check target sensor or the responsiveness of a parameter of process detected by the validity check target sensor. The same applies to the operational action extracting step S123 described below.

The operational action extracting step S123 is a step of extracting, from the operation history stored in the operation history storage unit 206, an operational action at the same time as the first alert extracted in the issuance history extracting step S110 In the operational action extracting step S123, the operational action extracting unit 212 extracts, for all first alerts extracted in the issuance history extracting step S110, an operational action at the same time as the issuance of the first alert, from the operation history storage unit 206.

The verifying step S125 is a step of extracting, from the operational data storage unit 205, information indicating the operational state of the facility 10 after the operational action extracted in the operational action extracting step S123, and verifying the influence of the operational action on the operational state of the facility 10. In the verifying step S125, the verifying unit 213 of the analysis unit 210 extracts, from the operational data storage unit 205, information indicating the operational state of the facility 10 in a specified period after the operational action extracted by the operational action extracting unit 212 in the operational action extracting step S123. The specified period may be a period, with a certain margin, from the time when the operational action is performed to the time when it is estimated that the information indicating the operational state of the facility 10 changes due to the operational action.

Then, the verifying unit 213 verifies whether the operational state of the facility 10 has improved due to the operational action, based on the information indicating the operational state of the facility 10 extracted as described above. For example, the verifying unit 213 determines that, if the detected value of the sensor 80 has no longer satisfied the issuance criterion within the specified period after the operational action, the operational state of the facility 10 has improved due to the operational action, based on the information indicating the operational state of the facility 10 extracted as described above. Further, for example, the verifying unit 213 determines that, if the detected value of the sensor 80 has still satisfied the issuance criterion for the specified period after the operational action, the operational state of the facility 10 has not improved due to the operational action, based on the information indicating the operational state of the facility 10 extracted as described above.

The validity determining step S130 is a step of determining the validity of issuance of the first alert in response to issuance of the first alert, based on a result obtained in the validity analysis step S120. In the validity determining step S130, the analysis unit 210 waits until a new first alert regarding the validity check target sensor is issued. As described above, since the information output from the detecting unit 201 includes information indicating which of the sensors 80 is related to the issuance signal and information on the type of the alert, the analysis unit 210 can determine whether a new first alert regarding the validity check target sensor is issued.

When it is determined that a new first alert regarding the validity check target sensor is issued, the analysis unit 210 determines the validity of the issuance of the first alert for example as follows.

For example, if it is determined from the result obtained in the validity analysis step S120 that there is no evidence that any operational action has been performed even though the first alert was issued in the past, the analysis unit 210 determines that the first alert issued this time is inappropriate.

Further, for example, if it is found from the result obtained in the validity analysis step S120 that, when the first alert was issued in the past, the first alert was repeatedly issued within a short period of time, and then the validity check target sensor was subjected to maintenance, the analysis unit 210 determines that if the first alert this time is repeatedly issued within a short period of time, the first alert repeatedly issued is inappropriate.

Further, for example, if it is found from the result such as the issuance history of the second alert obtained in the validity analysis step S120 that an alert regarding a sensor other than the validity check target sensor was issued frequently at the same time as the first alert was issued in the past, but this alert is not issued this time, the analysis unit 210 determines that the first alert issued this time is inappropriate or is likely to be inappropriate.

Further, for example, if it is found from the information indicating the operational state of the facility 10 obtained in the validity analysis step S120 that a parameter of process that changed frequently when the first alert was issued in the past does not change this time, the analysis unit 210 determines that the first alert issued this time is inappropriate or is likely to be inappropriate.

Further, for example, as a result of determining whether the first alert issued this time is appropriate as described above, if the validity is not denied in any case, it is determined that the first alert issued this time is appropriate.

The analysis unit 210 causes the display device 103*a* of the input/output unit 103 to display a result of determining the validity of the first alert via the presenting unit 202, for example.

Thus, With the operation assistance method according to the above-described embodiment, since the validity of issuance of the alert is determined upon issuance of the alert, and the determination result is presented to the operator, the operator can recognize the validity of the issued alert, and determine whether the issued alert is false.

Further, for example, a false alert can be reduced by preventing the first alert determined to be inappropriate in the validity determining step S130 from being notified.

(Modification of Issuance Criterion)

For example, as described above, if it is determined in the validity determining step S130 that there is no evidence that any operational action has been performed even though the first alert was issued in the past, the issuance criterion may be inappropriate. In this case, as shown in FIG. 10, the issuance criterion may be optimized by further performing an issuance criterion modifying step S140.

Figure 10:
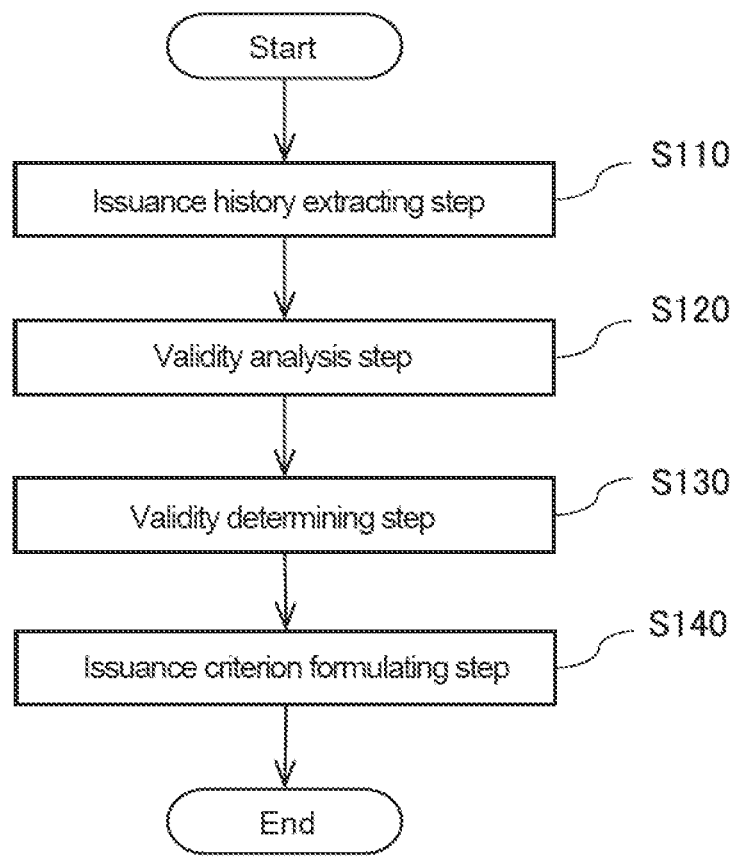
FIG. 10 is a flowchart showing the process for determining the validity of issuance of the alert.

FIG. 10 is a flowchart showing the process for determining the validity of issuance of the alert, further including the issuance criterion modifying step S140. The operation assistance method according to the embodiment shown in FIG. 10 includes, in addition to the issuance history extracting step S110, the validity analysis step S120, and the validity determining step S130, the issuance criterion modifying step S140.

In the operation assistance method according to the embodiment shown in FIG. 10, after the validity determining step S130, the issuance criterion modifying step S140 is performed.

The issuance criterion modifying step S140 is a step of modifying the issuance criterion, based on a result obtained in the validity analysis step S120. In the issuance criterion modifying step S140, for example, if it is determined in the validity determining step S130 that there is no evidence that any operational action has been performed even though the first alert was issued in the past, the alert issuance criterion modifying unit 203 changes the issuance criterion of the first alert, for example, from a currently-set criterion value by a specified value so as to extend the normal range to reset the issuance criterion. The specified value may be 10% of the criterion value, or may be set appropriately according to the responsiveness of the validity check target sensor or the responsiveness of a parameter of process detected by the validity check target sensor.

In the issuance criterion modifying step S140, the alert issuance criterion modifying unit 203 replaces the criterion value stored in the alert issuance criterion storage unit 207 by the reset criterion value.

As described above, if the alert issuance criterion is set to the safe side more than necessary, the operational action for eliminating the alert issuance factor may not be executed even if the alert is issued. In such a case, it is desirable to modify the alert issuance criterion so that the alert is issued at an appropriate timing.

In this regard, according to the above-described embodiment, the issuance criterion can be modified, based on at least one of the history of the second alert issued at the same time as the first alert that has been issued in the past, the operational action at the same time, or the verification result of the influence of the operational action on the operational state. Thus, for example, regarding a certain alert, it is possible to find the situation where, although the alert had been issued, the operational action for eliminating the alert issuance factor was not executed repeatedly. Further, it is possible to confirm whether a further malfunction event has not occurred even though the operational action for eliminating the alert issuance factor was not executed. If a further malfunction event has not occurred even though the operational action for eliminating the alert issuance factor was not executed, it may be determined that the alert issuance criterion is set to the safe side more than necessary, so that the alert issuance criterion may be modified. Thus, according to the above-described embodiment, it is possible to appropriately set the timing when the alert is issued.

When the issuance criterion is changed as described above, the operator may be notified that the issuance criterion is changed by displaying a screen indicating that the issuance criterion is changed on the display device 103*a* of the input/output unit 103.

(Detection of Sign of Alert Issuance)

In the above description, the alert issuing unit 102 of the facility control device 100 is configured to, if the output value of the sensor 80 satisfies the alert issuance criterion of the sensor 80, output an alert issuance signal. However, for example, the alert issuing unit 102 may be configured to notify detection of a sign of issuance of the alert.

Specifically, for example, the alert issuing unit 102 monitors the behavior of the output value of the sensor 80 input via the data acquisition unit 101, and compares it with a preset alert issuance sign detection criterion. The alert issuance sign detection criterion may be, for example, a combination of a time derivative value indicating whether the output value of the sensor 80 increases or decreases over time and a criterion value which is an absolute value of the output value of the sensor 80. In the following, the alert issuance sign detection criterion is also simply referred to as a sign detection criterion.

For example, when the issuance criterion is set by the upper limit of the detected value of the sensor 80, the alert issuing unit 102 may be configured to, if the time derivative value of the output value of the sensor 80 input via the data acquisition unit 101 exceeds the time derivative value of the sign detection criterion, and the output value of the sensor 80 input via the data acquisition unit 101 exceeds the criterion value of the sign detection criterion, determine that a sign of alert issuance is detected, and notify the detection of the sign of alert issuance.

Similarly, for example, when the issuance criterion is set by the lower limit of the detected value of the sensor 80, the alert issuing unit 102 may be configured to, if the time derivative value of the output value of the sensor 80 input via the data acquisition unit 101 falls below the time derivative value of the sign detection criterion, and the output value of the sensor 80 input via the data acquisition unit 101 falls below the criterion value of the sign detection criterion, determine that a sign of alert issuance is detected, and notify the detection of the sign of alert issuance.

The alert issuing unit 102 thus configured may be referred to as a sign detection notifying unit.

As described above, when the alert issuing unit 102 is configured to detect and notify a sign of issuance of the alert, the sign detection criterion is stored in the alert issuance criterion storage unit 207. In this case, the alert issuance criterion storage unit 207 may be referred to as a sign detection criterion storage unit.

As described above, when the alert issuing unit 102 is configured to detect and notify a sign of issuance of the alert, the sign detection criterion may be obtained based on the alert issuance history stored in the alert history storage unit 204 and information before issuance of the alert among the information indicating the operational state of the facility 10 stored in the operational data storage unit 205.

FIG. 11 is a flowchart showing the process for obtaining the sign detection criterion. The operation assistance method according to the embodiment shown in FIG. 11 includes an issuance history extracting step S210, an operational state information extracting step S220, and a sign detection criterion formulating step S230.

The issuance history extracting step S210 is a step of extracting the alert issued in the past from the issuance history stored in the alert history storage unit 204. In the issuance history extracting step S210, the issuance history extracting unit 211 of the analysis unit 210 of the operation assistance device 200 selects the sensor 80 for which the sign detection criterion is to be obtained, of the plurality of sensors 80, and extracts the alert issuance history regarding the selected sensor 80 from the alert history storage unit 204. In the following, the selected sensor 80 is referred to as a sign detection criterion formulation target sensor.

That is, in the issuance history extracting step S210, the issuance history extracting unit 211 of the analysis unit 210 of the operation assistance device 200 extracts the issuance history of the alert regarding the sign detection criterion formulation target sensor from the alert history storage unit 204.

The sign detection criterion formulation target sensor may be the sensor 80 appropriately selected by the issuance history extracting unit 211, or may be the sensor 80 previously selected by the operator.

The operational state information extracting step S220 is a step of extracting information before issuance of the alert regarding the sign detection criterion formulation target sensor from the information indicating the operational state of the facility 10 stored in the operational data storage unit 205. In the operational state information extracting step S220, the analysis unit 210 acquires the issuance date and time of the alert regarding the sign detection criterion formulation target sensor, from the alert issuance history extracted in the issuance history extracting step S210. Further, the analysis unit 210 reads the detected value of the sign detection criterion formulation target sensor in a period from the acquired date and time to the time a specified period before, from the operational data storage unit 205. The specified period is appropriately set according to the responsiveness of the sign detection criterion formulation target sensor, the ability to detect a parameter of process detected by the sign detection criterion formulation target sensor, i.e., the time until the change in process state is reflected in the change in parameter or the degree of the change.

In the sign detection criterion formulating step S230, the sign detection criterion is formulated from the detected value of the sign detection criterion formulation target sensor read from the operational data storage unit 205 in the operational state information extracting step S220. For example, in the sign detection criterion formulating step S230, the analysis unit 210 calculates the time derivative value of the detected value of the sign detection criterion formulation target sensor, for example, in the latter half of the specified period, from the detected value of the sign detection criterion formulation target sensor read from the operational data storage unit 205 in the operational state information extracting step S220, and defines a value obtained by reducing the absolute value of the calculated time derivative value by, for example, about 10% as the time derivative value of the sign detection criterion. Further, when the issuance criterion of the alert regarding the sign detection criterion formulation target sensor is set by the upper limit of the detected value of the sensor 80, the analysis unit 210 defines a value obtained by reducing the issuance criterion value by, for example, about 10%, as the criterion value of the sign detection criterion. Further, when the issuance criterion of the alert regarding the sign detection criterion formulation target sensor is set by the lower limit of the detected value of the sensor 80, the analysis unit 210 defines a value obtained by increasing the issuance criterion value by, for example, about 10% of a possible maximum value of the detected value, as the criterion value of the sign detection criterion.

Further, the analysis unit 210 outputs the sign detection criterion defined by the time derivative value of the sign detection criterion and the criterion value of the sign detection criterion thus calculated to the alert issuance criterion storage unit (sign detection criterion storage unit) 207. The alert issuance criterion storage unit (sign detection criterion storage unit) 207 stores the sign detection criterion output from the analysis unit 210.

As a result, the sign of issuance of the alert can be detected by using the obtained sign detection criterion, so that the occurrence of non-conformity event can be suppressed, which contributes to the stable operation of the facility 10.

Figure 8:
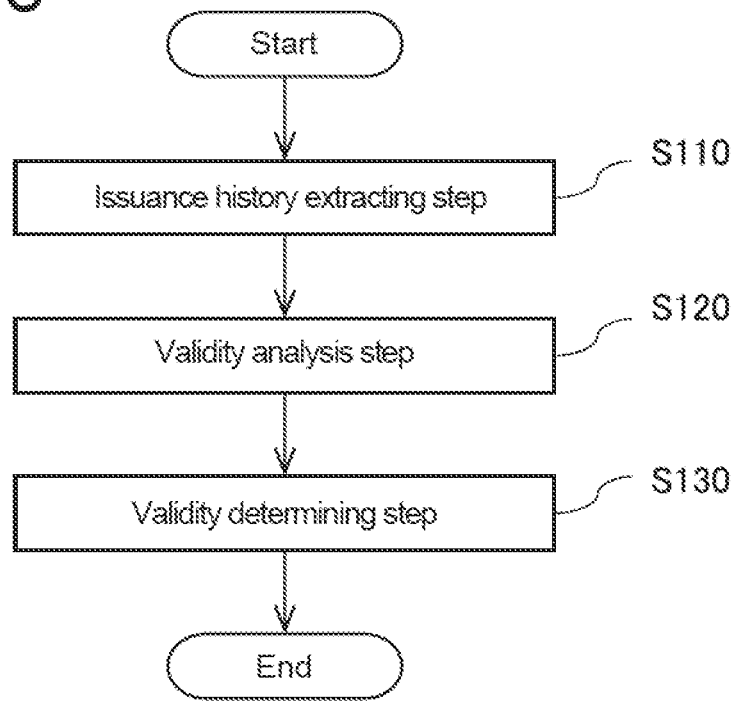
FIG. 8 is a flowchart showing the process for determining the validity of issuance of the alert.

As described above, when the alert issuing unit 102 is configured to detect and notify a sign of issuance of the alert, for example in the validity determining step S130 of FIGS. 8 and 10, the analysis unit 210 may wait until a sign of issuance of a new first alert regarding the validity check target sensor is detected. When it is determined that a sign of issuance of a new first alert regarding the validity check target sensor is detected, the analysis unit 210 may determine the validity of the sign of issuance of the first alert for example as follows.

For example, if it is determined from the result obtained in the validity analysis step S120 that there is no evidence that any operational action has been performed even though the sign of issuance of the first alert was detected in the past, the analysis unit 210 determines that the detection of the sign of issuance of the first alert this time is inappropriate.

Further, for example, if it is found from the result obtained in the validity analysis step S120 that, when the sign of issuance of the first alert was detected in the past, the sign of issuance of the first alert was repeatedly detected within a short period of time, and then the validity check target sensor was subjected to maintenance, the analysis unit 210 determines that if the sign of issuance of the first alert this time is repeatedly detected within a short period of time, the sign of issuance of the first alert repeatedly detected is inappropriate.

Further, for example, if it is found from the result such as the issuance history of the second alert obtained in the validity analysis step S120 that an alert regarding a sensor other than the validity check target sensor was issued frequently at the same time as the sign of issuance of the first alert was detected in the past, but this alert is not issued this time, the analysis unit 210 determines that the sign of issuance of the first alert detected this time is inappropriate or is likely to be inappropriate.

Further, for example, if it is found from the information indicating the operational state of the facility 10 obtained in the validity analysis step S120 that a parameter of process that changed frequently when the sign of issuance of the first alert was detected in the past does not change this time, the analysis unit 210 determines that the sign of issuance of the first alert detected this time is inappropriate or is likely to be inappropriate.

Further, for example, as a result of determining whether the sign of issuance of the first alert detected this time is appropriate as described above, if the validity is not denied in any case, it is determined that the detection of the sign of the first alert this time is appropriate.

(Modification of Sign Detection Criterion)

For example, as described above, if it is determined in the validity determining step S130 that there is no evidence that any operational action has been performed even though the sign of issuance of the first alert was detected in the past, the sign detection criterion may be inappropriate. In this case, the sign detection criterion may be optimized as described below.

For example, in the issuance criterion modifying step S140, if it is determined in the validity determining step S130 that there is no evidence that any operational action has been performed even though the sign of issuance of the first alert was detected in the past, the alert issuance criterion modifying unit 203 changes the sign detection criterion of the first alert, for example, from a currently-set criterion value of the sign detection criterion by a specified value so as to extend the normal range to reset the sign detection criterion. The specified value may be, for example, 10% of the criterion value of the sign detection criterion, or may be appropriately set according to the responsiveness of the validity check target sensor, the ability to detect a parameter of process detected by the validity check target sensor, i.e., the time until the change in process state is reflected in the change in parameter or the degree of the change.

In the issuance criterion modifying step S140, the alert issuance criterion modifying unit 203 replaces the criterion value of the sign detection criterion stored in the alert issuance criterion storage unit 207 by the reset criterion value.

In this case, the alert issuance criterion modifying unit 203 may be referred to as a sign detection criterion formulating/modifying unit.

The present invention is not limited to the embodiments described above, but includes modifications to the embodiments described above, and embodiments composed of combinations of those embodiments.

For example, in the above-described embodiments, the boiler plant has been described as an example of the large-scale facility, but the present invention is not limited thereto. The facility 10 may be, for example, a nuclear power plant or a chemical plant.

Further, the operation assistance system 1 may be disposed not only on the boiler plant as described above, but also on each device in the plant, such as the denitration device 50 and the dust treatment device 51 shown in FIG. 3, and the ash treatment device and the coal transfer device, not shown in FIG. 3.

REFERENCE SIGNS LIST

1 Operation assistance system
10 Facility
80 Sensor
100 Facility control device
200 Operation assistance device
201 Detecting unit
202 Presenting unit
203 Alert issuance criterion modifying unit
204 Alert history storage unit 205 Operational data storage unit
206 Operation history storage unit
207 Alert issuance criterion storage unit
208 Selection history storage unit
210 Analysis unit
211 Issuance history extracting unit
212 Operational action extracting unit
213 Verifying unit

The invention claimed is:

1. An operation assistance method for presenting a recommended operational action in response to an alert issued when an issuance criterion is satisfied in a facility, comprising:

detecting issuance of the alert or a sign of issuance of the alert;
  extracting, from an alert issuance history of the facility, an issuance history of a same type of alert as the alert of which the issuance or the sign of issuance has been detected;
  extracting, from an operation history of the facility, a past operational action after issuance of the same type of alert;
  after detecting issuance of the alert or the sign of issuance of the alert, extracting, from an operational state history of the facility, information indicating a past operational state after the past operational action, and verifying an influence of the past operational action on the past operational state;
  presenting the recommended operational action in response to the alert of which the issuance or the sign of issuance has been detected, based on the extracted past operational action and the verified influence;
  performing at least one of: extraction of a history of a second alert issued at a same time as a first alert that has been issued in past from the issuance history; extraction of the past operational action at the same time from the operation history; or extraction of information indicating the past operational state after the operational action from the operational state history and verification of an influence of the past operational action on the past operational state;
  determining validity of issuance of the first alert in response to issuance of the first alert, based on a result obtained by performing the at least one; and
  modifying the issuance criterion or a sign detection criterion for detecting the sign, based on a result obtained by-performing the at least one,
  wherein the selected recommended operational action is executed by outputting a control signal from an operation control unit for controlling the facility to a device included in the facility, based on sensor information of the facility indicating an operational state of the facility and a control signal output from an input/output unit of the operation control unit.

2. The operation assistance method according to claim 1, wherein
  the recommended operational action includes a plurality of recommended operational actions, and
  the operation assistance method further comprises determining an order in which the recommended operational actions are presented, according to priority of the plurality of recommended operational actions.

3. The operation assistance method according to claim 2, further comprising
  setting the priority of the recommended operational action for avoiding a failure that may cause a trip of the facility to be higher than the other recommended operational actions.

4. The operation assistance method according to claim 1, wherein
  when presenting the recommended operational action, presenting the recommended operational action only in response to the alert that has been previously selected.

5. The operation assistance method according to claim 1, wherein the recommended operational action is displayed on a display device of an operation control unit for controlling the facility,
  wherein the method comprises:
  when an operator selects the recommended operation action, executing the selected recommended operational action using the operation control unit.

6. The operation assistance method according to claim 1, wherein
  when presenting the recommended operational action, presenting the recommended operational action in consideration of each of the extracted operational actions, each of the verified influences, a combination of the plurality of different alerts, and a timing when each of the plurality of different alerts is issued.

7. The operation assistance method according to claim 1, further comprising obtaining a sign detection criterion for detecting the sign, based on the alert issuance history and information before issuance of the alert among the operational state history.

* * * * *